US009854182B2

(12) United States Patent
Georgiev

(10) Patent No.: US 9,854,182 B2
(45) Date of Patent: *Dec. 26, 2017

(54) FOLDED OPTIC ARRAY CAMERA USING REFRACTIVE PRISMS

(71) Applicant: QUALCOMM Incorporated, San Diego, CA (US)

(72) Inventor: Todor Georgiev Georgiev, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/400,733

(22) Filed: Jan. 6, 2017

(65) Prior Publication Data
US 2017/0118421 A1 Apr. 27, 2017

Related U.S. Application Data

(63) Continuation of application No. 14/742,285, filed on Jun. 17, 2015, now Pat. No. 9,541,740.
(Continued)

(51) Int. Cl.
H04N 5/225 (2006.01)
H04N 5/341 (2011.01)
(Continued)

(52) U.S. Cl.
CPC ........... *H04N 5/3415* (2013.01); *G02B 5/045* (2013.01); *G02B 13/0065* (2013.01);
(Continued)

(58) Field of Classification Search
CPC ..................................................... H04N 5/3415
(Continued)

(56) References Cited

U.S. PATENT DOCUMENTS 3,698,803 A 10/1972 Watanuki
4,114,171 A 9/1978 Altman
(Continued)

FOREIGN PATENT DOCUMENTS

CN 101201459 A 6/2008
CN 101571666 A 11/2009
(Continued)

OTHER PUBLICATIONS

Arican, et al., "Intermediate View Generation for Perceived Depth Adjustment of Sterio Video", Mitsubishi Electric Research Laboratories, http://www.merl.com, TR2009-052, Sep. 2009; 12 pages.
(Continued)

Primary Examiner — Usman Khan
(74) Attorney, Agent, or Firm — Knobbe, Martens, Olson & Bear, LLP

(57) ABSTRACT

Aspects relate to a prism array camera having a wide field of view. For example, the prism array camera can use a central refractive prism, for example with multiple surfaces or facets, to split incoming light comprising the target image into multiple portions for capture by the sensors in the array. The prism can have a refractive index of approximately 1.5 or higher, and can be shaped and positioned to reduce chromatic aberration artifacts and increase the FOV of a sensor. In some examples a negative lens can be incorporated into or attached to a camera-facing surface of the prism to further increase the FOV.

20 Claims, 16 Drawing Sheets

Related U.S. Application Data

(60) Provisional application No. 62/015,317, filed on Jun. 20, 2014.

(51) Int. Cl.
*H04N 5/232* (2006.01)
*G06T 3/40* (2006.01)
*G02B 5/04* (2006.01)
*G02B 13/00* (2006.01)
*G02B 13/06* (2006.01)
*G03B 17/17* (2006.01)
*G03B 37/04* (2006.01)

(52) U.S. Cl.
CPC ............. *G02B 13/06* (2013.01); *G03B 17/17* (2013.01); *G03B 37/04* (2013.01); *G06T 3/4038* (2013.01); *H04N 5/2254* (2013.01); *H04N 5/2258* (2013.01); *H04N 5/23238* (2013.01)

(58) Field of Classification Search
USPC .......................................................... 348/262
See application file for complete search history.

(56) References Cited

U.S. PATENT DOCUMENTS

| | | |
|---|---|---|
| 4,437,745 A | 3/1984 | Hajnal |
| 4,639,586 A | 1/1987 | Fender et al. |
| 4,740,780 A | 4/1988 | Brown et al. |
| 4,751,570 A | 6/1988 | Robinson |
| 5,012,273 A | 4/1991 | Nakamura et al. |
| 5,016,109 A | 5/1991 | Gaylord |
| 5,063,441 A | 11/1991 | Lipton et al. |
| 5,142,357 A | 8/1992 | Lipton et al. |
| 5,194,959 A | 3/1993 | Kaneko et al. |
| 5,207,000 A | 5/1993 | Chang et al. |
| 5,231,461 A | 7/1993 | Silvergate et al. |
| 5,243,413 A | 9/1993 | Gitlin et al. |
| 5,313,542 A | 5/1994 | Castonguay |
| 5,475,617 A | 12/1995 | Castonguay |
| 5,506,913 A | 4/1996 | Ibison et al. |
| 5,539,483 A | 7/1996 | Nalwa |
| 5,606,627 A | 2/1997 | Kuo |
| 5,614,941 A | 3/1997 | Hines |
| 5,640,222 A | 6/1997 | Paul |
| 5,642,299 A | 6/1997 | Hardin et al. |
| 5,686,960 A | 11/1997 | Sussman et al. |
| 5,721,585 A | 2/1998 | Keast et al. |
| 5,734,507 A | 3/1998 | Harvey |
| 5,745,305 A | 4/1998 | Nalwa |
| 5,760,846 A | 6/1998 | Lee |
| 5,793,527 A | 8/1998 | Nalwa |
| 5,903,306 A | 5/1999 | Heckendorn et al. |
| 5,926,411 A | 7/1999 | Russell |
| 5,990,934 A | 11/1999 | Nalwa |
| 6,111,702 A | 8/2000 | Nalwa |
| 6,115,176 A | 9/2000 | Nalwa |
| 6,128,143 A | 10/2000 | Nalwa |
| 6,141,034 A | 10/2000 | McCutchen |
| 6,141,145 A | 10/2000 | Nalwa |
| 6,144,501 A | 11/2000 | Nalwa |
| 6,195,204 B1 | 2/2001 | Nalwa |
| 6,219,090 B1 | 4/2001 | Nalwa |
| 6,285,365 B1 | 9/2001 | Nalwa |
| 6,356,397 B1 | 3/2002 | Nalwa |
| 6,421,185 B1 | 7/2002 | Wick et al. |
| 6,611,289 B1 | 8/2003 | Yu et al. |
| 6,628,897 B2 | 9/2003 | Suzuki |
| 6,650,774 B1 | 11/2003 | Szeliski |
| 6,700,711 B2 | 3/2004 | Nalwa |
| 6,701,081 B1 | 3/2004 | Dwyer et al. |
| 6,768,509 B1 | 7/2004 | Bradski et al. |
| 6,775,437 B2 | 8/2004 | Kazarinov et al. |
| 6,782,137 B1 | 8/2004 | Avinash |
| 6,798,406 B1 | 9/2004 | Jones et al. |
| 6,809,887 B1 | 10/2004 | Gao et al. |
| 6,850,279 B1 | 2/2005 | Scherling |
| 6,855,111 B2 | 2/2005 | Yokoi et al. |
| 6,861,633 B2 | 3/2005 | Osborn |
| 6,862,364 B1 | 3/2005 | Berestov |
| 6,987,534 B1 | 1/2006 | Seta |
| 6,992,700 B1 | 1/2006 | Sato et al. |
| 7,006,123 B2 | 2/2006 | Yoshikawa et al. |
| 7,039,292 B1 | 5/2006 | Breiholz |
| 7,084,904 B2 | 8/2006 | Liu et al. |
| 7,116,351 B2 | 10/2006 | Yoshikawa |
| 7,215,479 B1 | 5/2007 | Bakin |
| 7,253,394 B2 | 8/2007 | Kang |
| 7,271,803 B2 | 9/2007 | Ejiri et al. |
| 7,336,299 B2 | 2/2008 | Kostrzewski et al. |
| 7,612,953 B2 | 11/2009 | Nagai et al. |
| 7,710,463 B2 | 5/2010 | Foote |
| 7,805,071 B2 | 9/2010 | Mitani |
| 7,817,354 B2 | 10/2010 | Wilson et al. |
| 7,860,214 B1 | 12/2010 | Haff |
| 7,893,957 B2 | 2/2011 | Peters et al. |
| 7,961,398 B2 | 6/2011 | Tocci |
| 7,978,222 B2 | 7/2011 | Schneider |
| 8,004,557 B2 | 8/2011 | Pan |
| 8,098,276 B2 | 1/2012 | Chang et al. |
| 8,115,813 B2 | 2/2012 | Tang |
| 8,139,125 B2 | 3/2012 | Scherling |
| 8,228,417 B1 | 7/2012 | Georgiev et al. |
| 8,267,601 B2 | 9/2012 | Campbell et al. |
| 8,284,263 B2 | 10/2012 | Oohara et al. |
| 8,294,073 B1 | 10/2012 | Vance et al. |
| 8,356,035 B1 | 1/2013 | Baluja et al. |
| 8,400,555 B1 | 3/2013 | Georgiev et al. |
| 8,442,392 B2 | 5/2013 | Ollila et al. |
| 8,482,813 B2 | 7/2013 | Kawano et al. |
| 8,791,984 B2 | 7/2014 | Jones et al. |
| 8,836,693 B2 | 9/2014 | Katano |
| 8,928,988 B1 | 1/2015 | Ford et al. |
| 8,988,564 B2 | 3/2015 | Webster et al. |
| 9,049,375 B2 | 6/2015 | Wade et al. |
| 9,055,208 B2 | 6/2015 | Kim |
| 9,264,610 B2 | 2/2016 | Duparre |
| 9,294,672 B2 | 3/2016 | Georgiev et al. |
| 9,316,810 B2 | 4/2016 | Mercado |
| 9,332,188 B2 | 5/2016 | Takei et al. |
| 9,374,516 B2 | 6/2016 | Osborne |
| 9,383,550 B2 | 7/2016 | Osborne |
| 9,386,222 B2 | 7/2016 | Georgiev et al. |
| 9,398,264 B2 | 7/2016 | Georgiev et al. |
| 9,438,889 B2 | 9/2016 | Atanassov et al. |
| 9,485,495 B2 | 11/2016 | Atanassov et al. |
| 9,609,210 B2 | 3/2017 | Djordjevic et al. |
| 2001/0028482 A1 | 10/2001 | Nishioka |
| 2002/0070365 A1 | 6/2002 | Karellas |
| 2002/0136150 A1 | 9/2002 | Mihara et al. |
| 2003/0024987 A1 | 2/2003 | Zhu |
| 2003/0034395 A1 | 2/2003 | Tsikos et al. |
| 2003/0038814 A1 | 2/2003 | Blume |
| 2003/0214575 A1 | 11/2003 | Yoshikawa |
| 2004/0021767 A1 | 2/2004 | Endo et al. |
| 2004/0051805 A1 | 3/2004 | Yoshikawa et al. |
| 2004/0066449 A1 | 4/2004 | Givon |
| 2004/0105025 A1 | 6/2004 | Scherling |
| 2004/0183907 A1 | 9/2004 | Hovanky et al. |
| 2004/0195492 A1 | 10/2004 | Hsin |
| 2004/0246333 A1 | 12/2004 | Steuart et al. |
| 2004/0263611 A1 | 12/2004 | Cutler |
| 2005/0053274 A1 | 3/2005 | Mayer et al. |
| 2005/0057659 A1 | 3/2005 | Hasegawa |
| 2005/0081629 A1 | 4/2005 | Hoshal |
| 2005/0111106 A1 | 5/2005 | Matsumoto et al. |
| 2005/0185711 A1 | 8/2005 | Pfister et al. |
| 2005/0218297 A1 | 10/2005 | Suda et al. |
| 2005/0243175 A1 | 11/2005 | Yamada et al. |
| 2006/0023074 A1 | 2/2006 | Cutler |
| 2006/0023106 A1 | 2/2006 | Yee et al. |
| 2006/0023278 A1 | 2/2006 | Nishioka |
| 2006/0061660 A1 | 3/2006 | Brackmann |

(56) References Cited

U.S. PATENT DOCUMENTS

| | | |
|---|---|---|
| 2006/0098267 A1 | 5/2006 | Togawa |
| 2006/0140446 A1 | 6/2006 | Luo et al. |
| 2006/0193509 A1 | 8/2006 | Criminisi et al. |
| 2006/0215054 A1 | 9/2006 | Liang et al. |
| 2006/0215903 A1 | 9/2006 | Nishiyama |
| 2006/0238441 A1 | 10/2006 | Benjamin et al. |
| 2007/0024739 A1 | 2/2007 | Konno |
| 2007/0058961 A1 | 3/2007 | Kobayashi et al. |
| 2007/0064142 A1 | 3/2007 | Misawa et al. |
| 2007/0085903 A1 | 4/2007 | Zhang |
| 2007/0146530 A1 | 6/2007 | Nose |
| 2007/0164202 A1 | 7/2007 | Wurz et al. |
| 2007/0216796 A1 | 9/2007 | Lenel et al. |
| 2007/0242152 A1 | 10/2007 | Chen |
| 2007/0263115 A1 | 11/2007 | Horidan et al. |
| 2007/0268983 A1 | 11/2007 | Elam |
| 2008/0029708 A1 | 2/2008 | Olsen et al. |
| 2008/0030597 A1 | 2/2008 | Olsen et al. |
| 2008/0058629 A1 | 3/2008 | Seibel et al. |
| 2008/0088702 A1 | 4/2008 | Linsenmaier et al. |
| 2008/0117289 A1 | 5/2008 | Schowengerdt et al. |
| 2008/0117532 A1 | 5/2008 | Shafer |
| 2008/0218612 A1 | 9/2008 | Border et al. |
| 2008/0259172 A1 | 10/2008 | Tamaru |
| 2008/0266404 A1 | 10/2008 | Sato |
| 2008/0290435 A1 | 11/2008 | Oliver et al. |
| 2008/0291543 A1 | 11/2008 | Nomura et al. |
| 2008/0297612 A1 | 12/2008 | Yoshikawa |
| 2008/0316301 A1 | 12/2008 | Givon |
| 2009/0003646 A1 | 1/2009 | Au et al. |
| 2009/0005112 A1 | 1/2009 | Sorek et al. |
| 2009/0015812 A1 | 1/2009 | Schultz et al. |
| 2009/0051804 A1 | 2/2009 | Nomura et al. |
| 2009/0080695 A1 | 3/2009 | Yang |
| 2009/0085846 A1 | 4/2009 | Cho et al. |
| 2009/0096994 A1 | 4/2009 | Smits |
| 2009/0153726 A1 | 6/2009 | Lim |
| 2009/0160931 A1 | 6/2009 | Pockett et al. |
| 2009/0268983 A1 | 10/2009 | Stone et al. |
| 2009/0268985 A1 | 10/2009 | Wong et al. |
| 2009/0296984 A1 | 12/2009 | Nijim et al. |
| 2009/0315808 A1 | 12/2009 | Ishii |
| 2010/0044555 A1 | 2/2010 | Ohara et al. |
| 2010/0045774 A1 | 2/2010 | Len et al. |
| 2010/0066812 A1 | 3/2010 | Kajihara et al. |
| 2010/0165155 A1 | 7/2010 | Chang |
| 2010/0202766 A1 | 8/2010 | Takizawa et al. |
| 2010/0215249 A1 | 8/2010 | Heitz et al. |
| 2010/0232681 A1 | 9/2010 | Fujieda et al. |
| 2010/0259655 A1 | 10/2010 | Takayama |
| 2010/0265313 A1 | 10/2010 | Liu et al. |
| 2010/0265363 A1 | 10/2010 | Kim |
| 2010/0278423 A1 | 11/2010 | Itoh et al. |
| 2010/0289878 A1 | 11/2010 | Sato et al. |
| 2010/0290703 A1 | 11/2010 | Sim et al. |
| 2010/0290769 A1 | 11/2010 | Nasiri et al. |
| 2010/0302396 A1 | 12/2010 | Golub et al. |
| 2010/0309286 A1 | 12/2010 | Chen et al. |
| 2010/0309333 A1 | 12/2010 | Smith et al. |
| 2011/0001789 A1 | 1/2011 | Wilson et al. |
| 2011/0007135 A1 | 1/2011 | Okada et al. |
| 2011/0009163 A1 | 1/2011 | Fletcher et al. |
| 2011/0012998 A1 | 1/2011 | Pan |
| 2011/0038535 A1 | 2/2011 | Wang et al. |
| 2011/0043623 A1 | 2/2011 | Fukuta et al. |
| 2011/0090575 A1 | 4/2011 | Mori |
| 2011/0096089 A1 | 4/2011 | Shenhav et al. |
| 2011/0096988 A1 | 4/2011 | Suen et al. |
| 2011/0128412 A1 | 6/2011 | Milnes et al. |
| 2011/0181588 A1 | 7/2011 | Barenbrug et al. |
| 2011/0213664 A1 | 9/2011 | Osterhout et al. |
| 2011/0235899 A1 | 9/2011 | Tanaka |
| 2011/0249341 A1 | 10/2011 | Difrancesco et al. |
| 2011/0262122 A1 | 10/2011 | Minamisawa et al. |
| 2011/0304764 A1 | 12/2011 | Shigemitsu et al. |
| 2012/0008148 A1 | 1/2012 | Pryce et al. |
| 2012/0044368 A1 | 2/2012 | Lin et al. |
| 2012/0056987 A1 | 3/2012 | Fedoroff |
| 2012/0075168 A1 | 3/2012 | Osterhout et al. |
| 2012/0229688 A1 | 9/2012 | Tajiri |
| 2012/0249750 A1 | 10/2012 | Izzat et al. |
| 2012/0249815 A1 | 10/2012 | Bohn et al. |
| 2012/0269400 A1 | 10/2012 | Heyward |
| 2012/0281072 A1 | 11/2012 | Georgiev et al. |
| 2012/0293607 A1 | 11/2012 | Bhogal et al. |
| 2012/0293632 A1 | 11/2012 | Yukich |
| 2012/0327195 A1 | 12/2012 | Cheng |
| 2013/0003140 A1 | 1/2013 | Keniston et al. |
| 2013/0010084 A1 | 1/2013 | Hatano |
| 2013/0038689 A1 | 2/2013 | McDowall |
| 2013/0076924 A1 | 3/2013 | Wade et al. |
| 2013/0077945 A1 | 3/2013 | Liu et al. |
| 2013/0128030 A1 | 5/2013 | Georgiev |
| 2013/0141802 A1 | 6/2013 | Yang |
| 2013/0182325 A1 | 7/2013 | Minamisawa et al. |
| 2013/0222556 A1 | 8/2013 | Shimada |
| 2013/0229529 A1 | 9/2013 | Lablans |
| 2013/0250045 A1 | 9/2013 | Ki et al. |
| 2013/0250053 A1 | 9/2013 | Levy |
| 2013/0250123 A1 | 9/2013 | Zhang et al. |
| 2013/0260823 A1 | 10/2013 | Shukla et al. |
| 2013/0278785 A1 | 10/2013 | Nomura et al. |
| 2013/0286451 A1 | 10/2013 | Verhaegh |
| 2013/0335598 A1 | 12/2013 | Gustavsson et al. |
| 2013/0335600 A1 | 12/2013 | Gustavsson et al. |
| 2014/0009631 A1 | 1/2014 | Topliss |
| 2014/0016832 A1 | 1/2014 | Kong et al. |
| 2014/0085502 A1 | 3/2014 | Lin et al. |
| 2014/0104378 A1 | 4/2014 | Kauff et al. |
| 2014/0111650 A1* | 4/2014 | Georgiev ............. G06T 3/4038 348/159 |
| 2014/0139623 A1 | 5/2014 | McCain et al. |
| 2014/0152852 A1 | 6/2014 | Ito et al. |
| 2014/0184749 A1 | 7/2014 | Hilliges et al. |
| 2014/0192253 A1 | 7/2014 | Laroia |
| 2014/0285673 A1 | 9/2014 | Hundley et al. |
| 2015/0043076 A1 | 2/2015 | Nakayama |
| 2015/0049172 A1 | 2/2015 | Ramachandra et al. |
| 2015/0070562 A1 | 3/2015 | Nayar et al. |
| 2015/0085363 A1 | 3/2015 | Liu et al. |
| 2015/0125092 A1 | 5/2015 | Zhuo et al. |
| 2015/0177524 A1 | 6/2015 | Webster et al. |
| 2015/0201128 A1 | 7/2015 | Dong |
| 2015/0244934 A1 | 8/2015 | Duparre et al. |
| 2015/0253647 A1 | 9/2015 | Mercado |
| 2015/0370040 A1 | 12/2015 | Georgiev |
| 2015/0371387 A1 | 12/2015 | Atanassov |
| 2015/0373252 A1 | 12/2015 | Georgiev |
| 2015/0373268 A1 | 12/2015 | Osborne |
| 2015/0373269 A1 | 12/2015 | Osborne |
| 2015/0373279 A1 | 12/2015 | Osborne |
| 2016/0014332 A1 | 1/2016 | De et al. |
| 2016/0085059 A1 | 3/2016 | Mercado |
| 2016/0127641 A1 | 5/2016 | Gove |
| 2016/0127646 A1 | 5/2016 | Osborne |
| 2016/0198087 A1 | 7/2016 | Georgiev et al. |
| 2016/0269602 A1 | 9/2016 | Osborne |
| 2016/0286121 A1 | 9/2016 | Georgiev et al. |
| 2016/0295112 A1 | 10/2016 | Georgiev et al. |
| 2016/0353008 A1 | 12/2016 | Osborne |
| 2017/0026570 A1 | 1/2017 | Shepard et al. |
| 2017/0038502 A1 | 2/2017 | Georgiev |

FOREIGN PATENT DOCUMENTS

| | | |
|---|---|---|
| CN | 101581828 A | 11/2009 |
| CN | 101867720 A | 10/2010 |
| CN | 101902657 A | 12/2010 |
| CN | 202405984 U | 8/2012 |
| EP | 0610605 A1 | 8/1994 |
| EP | 0751416 A1 | 1/1997 |
| EP | 1176812 A1 | 1/2002 |
| EP | 1383342 A2 | 1/2004 |
| EP | 1816514 A1 | 8/2007 |

(56) References Cited

FOREIGN PATENT DOCUMENTS

| | | | |
|---|---|---|---|
| EP | 1832912 A2 | 9/2007 | |
| EP | 2242252 A2 | 10/2010 | |
| GB | 2354390 A | 3/2001 | |
| GB | 2354391 A | 3/2001 | |
| JP | H06251127 A | 9/1994 | |
| JP | H089424 A | 1/1996 | |
| JP | H0847001 A | 2/1996 | |
| JP | H08125835 A | 5/1996 | |
| JP | 8194274 A | 7/1996 | |
| JP | H08242453 A | 9/1996 | |
| JP | H10142490 A | 5/1998 | |
| JP | 2001194114 A | 7/2001 | |
| JP | 2003304561 A | 10/2003 | |
| JP | 3791847 B1 | 6/2006 | |
| JP | 2006279538 A | 10/2006 | |
| JP | 2007147457 A | 6/2007 | |
| JP | 2007323615 A | 12/2007 | |
| JP | 2008009424 A | 1/2008 | |
| JP | 2009122842 A | 6/2009 | |
| JP | 2010041381 A | 2/2010 | |
| JP | 2010067014 A | 3/2010 | |
| JP | 2010128820 A | 6/2010 | |
| JP | 2010524279 A | 7/2010 | |
| KR | 20080071400 A | 8/2008 | |
| WO | WO-199321560 A1 | 10/1993 | |
| WO | WO-199847291 A2 | 10/1998 | |
| WO | WO-2006075528 A1 | 7/2006 | |
| WO | WO-2007129147 A1 | 11/2007 | |
| WO | WO-2008112054 A1 | 9/2008 | |
| WO | WO-2009047681 A1 | 4/2009 | |
| WO | WO-2009086330 A2 | 7/2009 | |
| WO | WO-2010019757 A1 | 2/2010 | |
| WO | WO-2012136388 A1 | 10/2012 | |
| WO | WO-2012164339 A1 | 12/2012 | |
| WO | WO-2013154433 A1 | 10/2013 | |
| WO | WO-2014012603 A1 | 1/2014 | |
| WO | WO-2014025588 A1 | 2/2014 | |

OTHER PUBLICATIONS

Han Y., et al., "Removing Illumination from Image Pair for Stereo Matching", Audio, Language and Image Processing (ICALIP), 2012 International Conference on, IEEE, Jul. 16, 2012, XP032278010, pp. 508-512.
Hao M., et al., "Object Location Technique for Binocular Stereo Vision Based on Scale Invariant Feature Transform Feature Points", SIFT, Journal of Harbin Engineering University, Jun. 2009, vol. 30, No. 6 pp. 649-653.
Hoff, et al., "Surfaces from Stereo: Integrating Feature Matching, Disparity Estimation, and Contour Detection", IEEE Transactions on Pattern Analysis and Machine Intelligence, vol. 11, No. 2, pp. 121-136, Feb. 1989.
Hua et al., "Design Analysis of a High-Resolution Panoramic Camera Using Conventional Imagers and a Mirror Pyramid," IEEE Transactions on Pattern Analysis and Machine Intelligence; Feb. 2007; 29(2): 356-361.
International Search Report and Written Opinion—PCT/US2015/036415—ISA/EPO—dated Nov. 18, 2015.
Kawanishi T., et al., "Generation of High-Resolution Stereo Panoramic Images by Omnidirectional Imaging Sensor Using Hexagonal Pyramidal Mirrors", Pattern Recognition, 1998, Proceedings, Fourteenth International Conference on Brisbane, Qld., Australia Aug. 16-20, 1998, Los Alamitos, CA, USA,IEEE Comput. Soc, US, Jan. 1, 1998 (Jan. 1, 1998), pp. 485-489, vol. 1, XP031098377, ISBN: 978-0-8186-8512-5.
Krotkov E., et al., "Active vision for reliable ranging: Cooperating focus, stereo, and convergence", International Journal of Computer Vision. vol. 11, No. 2, Oct. 1, 1993 (Oct. 1, 1993), pp. 187-203, XP055149875, ISSN: 0920-5691. DOI: 10.1007/BF01469228.
Meng et al., "Single-shot Specular Surface Reconstruction with Gonio-plenoptic Imaging," 2015 IEEE International Conference on Computer Vision, pp. 3433-3441.
Murphy M., et al., "Lens Drivers Focus on Performance in High-Resolution Camera Modules," Analog Dialogue, Nov. 2006, vol. 40, pp. 1-3.
Narkhede, et al., "Stereoscopic Imaging: A Real-Time, In Depth Look," IEEE Potentials, Feb./Mar. 2004, vol. 23, Issue 1, pp. 38-42.
Ricoh Imagine Change: "New Ricoh Theta Model, Capturing 360-degree Images in One Shot, is on Sale Soon—Spherical Video Function, API and SDK (Beta Version)", News Release, Oct. 28, 2014, 3 pages.
Shuchun Y., et al., "Preprocessing for stereo vision based on LOG filter," Proceedings of 2011 6th International Forum on Strategic Technology, Aug. 2011, XP055211077, pp. 1074-1077.
Sun W.S., et al., "Single-Lens Camera Based on a Pyramid Prism Array to Capture Four Images," Optical Review, 2013, vol. 20 (2), pp. 145-152.
Tan K-H., et al., "Multiview Panoramic Cameras Using a Pyramid", Omnidirectional Vision, 2002, Proceedings, Third Workshop on Jun. 2, 2002, Piscataway, NJ, USA,IEEE, Jan. 1, 2002 (Jan. 1, 2002), pp. 87-93, XP010611080, ISBN: 978-0-7695-1629-5.
Chowdhury A., et al., "Challenges of Megapixel Camera Module Assembly and Test," Electronic Components and Technology Conference, 2005, pp. 1390-1401.

* cited by examiner

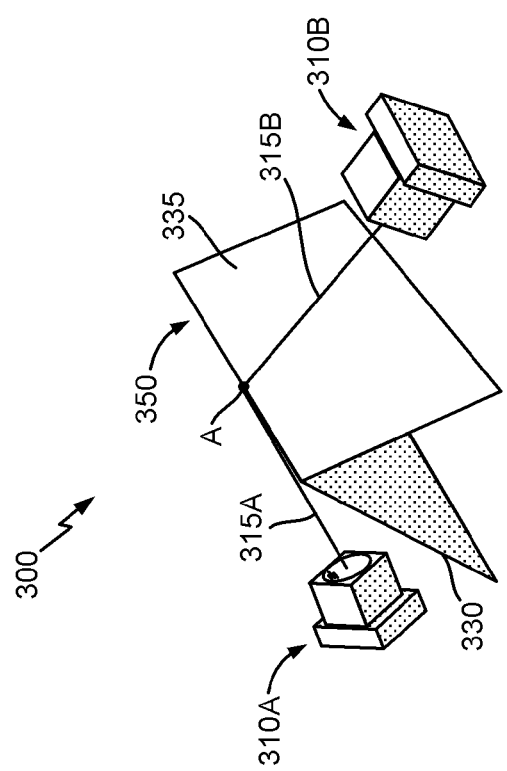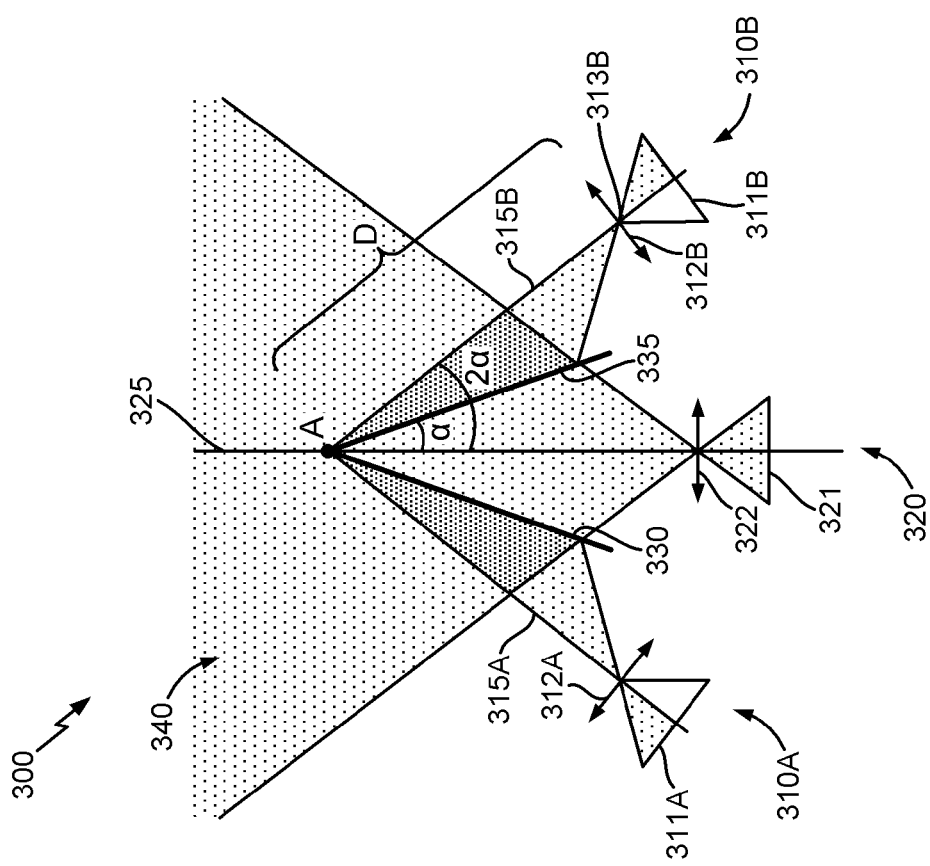
FIG. 3B
FIG. 3A

FOLDED OPTIC ARRAY CAMERA USING REFRACTIVE PRISMS

RELATED APPLICATIONS

This application is a continuation of U.S. patent application Ser. No. 14/742,285, filed Jun. 17, 2015, which claims the benefit of U.S. Provisional Patent Application No. 62/015,317, filed Jun. 20, 2014, and titled "FOLDED OPTIC ARRAY CAMERA USING REFRACTIVE PRISMS," and the contents of these applications is hereby incorporated by reference herein in their entirety.

TECHNICAL FIELD

The present disclosure relates to imaging systems and methods that include a multi-camera array. In particular, the disclosure relates to systems and methods that enable low-profile imaging systems and mobile devices while maintaining or improving image quality.

BACKGROUND

Many mobile devices, such as mobile phones and tablet computing devices, include cameras that may be operated by a user to capture still and/or video images. Because the mobile devices are typically designed to be relatively small, it can be important to design the cameras or imaging systems to be as thin as possible in order to maintain a low-profile mobile device. Folded optic image sensor arrays ("array cameras") allow for the creation of low-profile image capture devices without shortening the focal length or decreasing the resolution of the image across the sensor array's field of view. By redirecting light toward each sensor in the array using a primary and secondary surface, and by positioning the lens assemblies used to focus the incoming light between the primary and secondary surfaces, the sensor array may be positioned on a flat substrate perpendicular to the lens assemblies. The longer focal length makes it possible to implement features such as optical zoom and to incorporate more complicated optics that require more space than commonly afforded by the traditional mobile camera, such as adding more optical elements.

Some array cameras employ a central mirror or prism with multiple facets to split incoming light comprising the target image into multiple portions for capture by the sensors in the array, wherein each facet directs a portion of the light from the target image toward a sensor in the array. Each portion of the split light may be passed through a lens assembly and reflected off of a surface positioned directly above or below a sensor, such that each sensor captures a portion of the image. The sensor fields of view can overlap to assist in stitching together the captured portions into a complete image.

SUMMARY

The folded optic sensor arrays and image capture techniques described herein allow for the creation of low-profile image capture devices without shortening the focal length or decreasing the resolution of the image across the sensor array's field of view, wherein the captured images have increased field of view and reduced or eliminated camera field of view (FOV) artifacts. One challenge of existing array cameras is the quality degradation due to a camera in the array seeing over or around its corresponding mirror. Accordingly, image data not representing the image scene is captured, leading to problems during image stitching. Another challenge facing array cameras is that the FOV of the entire array is practically limited to around 60 degrees due to limits on the FOV of each individual camera. Typically, moving a camera closer to the central mirror could provide for FOV increases, however in low-profile array cameras the camera will begin to view itself in the mirror, and no significant FOV increase is achieved.

The above-described problems, among others, are addressed in some embodiments by the prism array cameras described herein. Some of the embodiments may employ a central refractive prism, for example with multiple surfaces or facets, to split incoming light comprising the target image into multiple portions for capture by the sensors in the array. In some embodiments, the prism can have a refractive index of approximately 1.5 or higher, and can be shaped and positioned to reduce chromatic aberration artifacts and increase the FOV of a sensor. For example, a top surface of the prism can be positioned orthogonally to the vertical axis of symmetry of the array (which may also be the optical axis of the array). In some embodiments, a lower interior surface of the prism can be positioned at an angle α relative to the vertical axis of symmetry, and a lower exterior surface (e.g., facing the corresponding camera) can be positioned orthogonally to the top surface. In other embodiments, a lower interior surface of the prism can be positioned at an angle α relative to the vertical axis of symmetry, and a lower exterior surface (e.g., facing the corresponding camera) can be positioned at an angle 2α relative to the top surface. In some examples a negative lens can be incorporated into or attached to the lower exterior surface to further increase the FOV. Such examples can provide for a total FOV of the array of up to 180 degrees.

Each portion of the split light may be passed through a lens assembly and reflected off of an optional additional reflective surface (or refracted through an optional additional prism) positioned directly above or below a sensor, such that each sensor captures a portion of the image. In some circumstances, each sensor in the array may capture a portion of the image which overlaps slightly with the portions captured by neighboring sensors in the array, and these portions may be assembled into the target image, for example by linear blending or other image stitching techniques.

One aspect relates to a prism array camera for capturing a target image scene, the system comprising a plurality of cameras positioned around a vertical axis of symmetry of the prism array camera, each camera of the plurality of cameras comprising an image sensor, and an optical axis positioned at a first angle relative to the vertical axis of symmetry, the first angle corresponding to an angular value; and a plurality of prisms, each prism configured to direct a portion of light representing the target image scene toward a corresponding camera of the plurality of cameras at least partially by refraction, each prism comprising a first surface positioned orthogonally to the vertical axis of symmetry of the prism array camera, the first surface positioned so that the portion of light representing the target image scene enters the prism through the first surface, a second surface positioned such that a plane formed by the second surface bisects the first angle between the optical axis of the corresponding camera and the vertical axis of symmetry, and a third surface, the second surface configured to redirect the portion of light received from the first surface toward the third surface, the third surface positioned such that the portion of light representing the target image scene exits the prism and travels toward the corresponding camera.

Another aspect relates to a method of manufacturing a prism array camera, the method comprising determining a vertical axis of symmetry of the prism array camera; and for each camera of a plurality of cameras of the prism array camera positioning the camera such that an optical axis of the camera is positioned at a first angle relative to the vertical axis of symmetry, the first angle corresponding to an angular value, and positioning an optical element such that a first surface of the optical element is positioned orthogonally to the vertical axis of symmetry, and a second surface of the optical element is positioned such that a plane formed by the second surface bisects the first angle.

Another aspect relates to a prism assembly for use in an array camera, the prism assembly comprising a vertical axis of symmetry; and a plurality of refractive optical elements each associated with a corresponding one of a plurality of cameras of the array camera and configured to pass a portion of light representing a target image scene toward the corresponding one of the plurality of cameras, each of the plurality of refractive optical elements comprising a first surface positioned orthogonally to the vertical axis of symmetry of the prism array camera, the first surface positioned so that the portion of light representing the target image scene enters the prism through the first surface, a second surface positioned such that a plane formed by the second surface bisects the first angle between the optical axis of the corresponding camera and the vertical axis of symmetry, a third surface, the second surface configured to redirect the portion of light received from the first surface toward the third surface, the third surface positioned such that the portion of light representing the target image scene exits the prism and travels toward the corresponding camera, and an apex defined by an intersection of the first surface and second surface.

Another aspect relates to an apparatus for capturing images, comprising means for capturing a plurality of portions of a target image scene; means for refracting light representing each portion of the plurality of portions, the means for refracting light comprising facets arranged in a geometric relationship comprising a first plane positioned orthogonally to a vertical axis of symmetry of the means for refracting light, a second plane positioned at a first angle relative to the vertical axis of symmetry, the first angle corresponding to a first angular value, and a third plane positioned at a second angle relative the first surface, the second angle corresponding to a second angular value that is substantially equal to double the first angular value; and means for assembling the plurality of portions into a final image of the target image scene.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

FIGS. 3A through 3C illustrate an embodiment of an array camera free of parallax and tilt artifacts.

DETAILED DESCRIPTION

I. Introduction

Implementations disclosed herein provide systems, methods and apparatus for generating images having a wide field of view, the images substantially free of parallax and tilt artifacts, using an array camera with folded optics. Aspects of the present invention relate to an array camera having a wide field of view, for example approximately 180 degrees. Replacing the mirrors with prisms fixes both of the above-mentioned problems—cameras seeing over the central mirror and limited FOV of each camera—at the same time. For example, a wide range of prism designs cameras do not see above the edge or the apex of the prism due to effects of total internal reflection. This fixes the first problem quite efficiently. In addition, the cameras gain wider FOV. In one class of designs this is related to introduction of chromatic aberrations. Another embodiment of the prism array camera design is completely free of aberrations. With higher refractive index glasses and other materials, field of view of individual cameras is unconstrained, and remains exactly the same as with a "free camera." In another embodiment of the prism array camera design, adding negative lenses to the prism can additionally increase the FOV of the individual cameras up to 90 degrees, making a total FOV of 180 degrees possible.

Each sensor in the array "sees" a portion of the image scene using a corresponding central prism, and accordingly each individual sensor/mirror pair represents only a sub-aperture of the total array camera. The complete array camera has a synthetic aperture generated based on the sum of all individual aperture rays, that is, based on stitching together the images generated by the sub-apertures.

In the following description, specific details are given to provide a thorough understanding of the examples. However, the examples may be practiced without these specific details.

II. Overview of Folded Optic Array Cameras

Figure 1A:
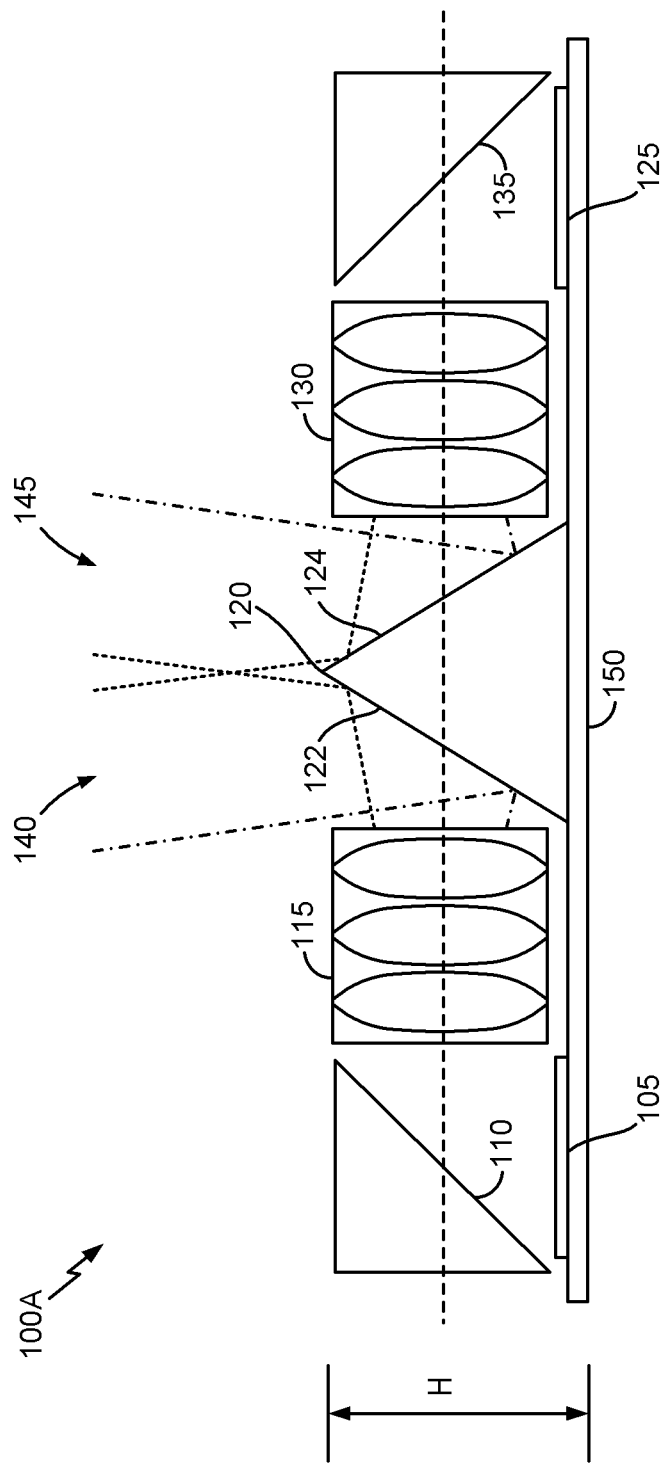
FIG. 1A illustrates a cross-sectional side view of an embodiment of a folded optic array camera.
Figure 1B:
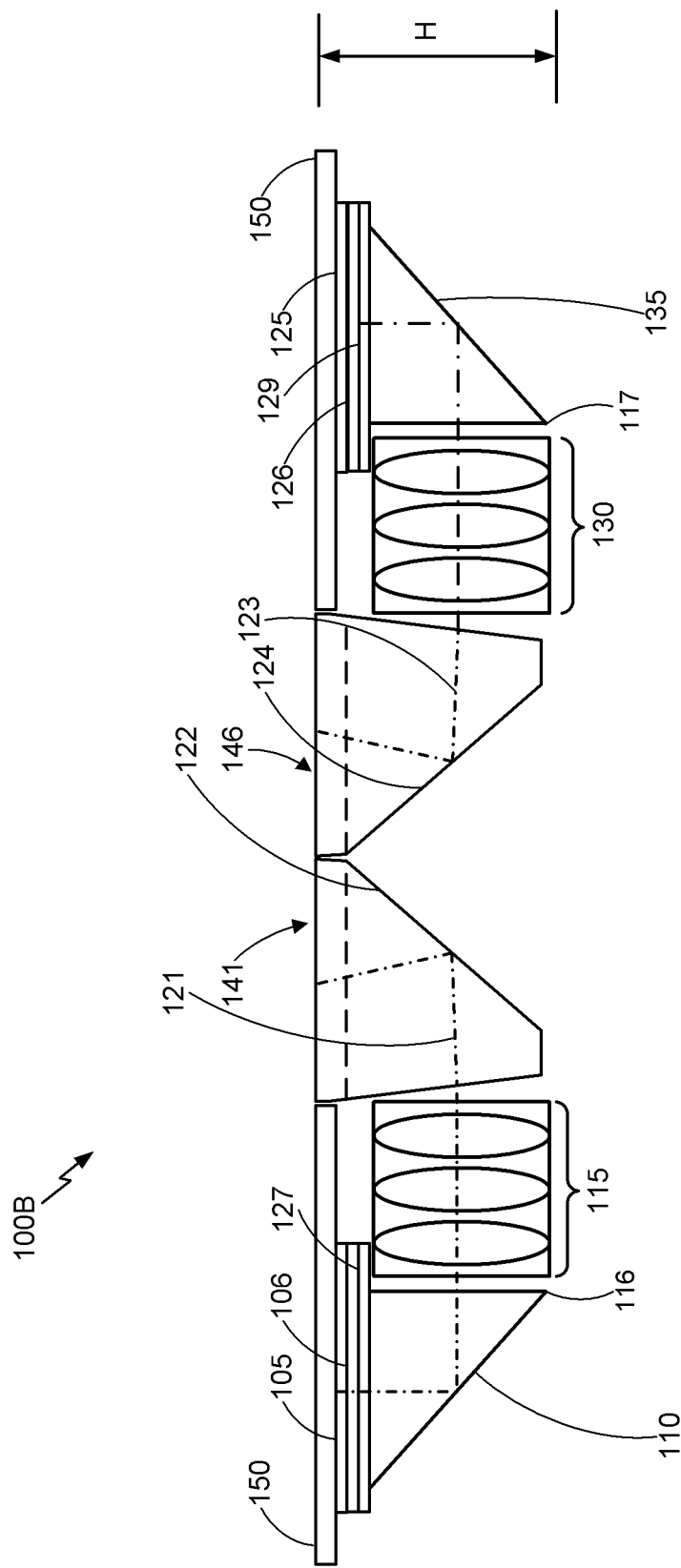
FIG. 1B illustrates a cross-sectional side view of another embodiment of a folded optic array camera.

Referring now to FIGS. 1A and 1B, examples of an a folded optic multi-sensor assembly 100A, 100B suitable for use with the autofocus systems and techniques described herein will now be described in greater detail. FIG. 1A illustrates a cross-sectional side view of an example of a folded optics array 100A including image sensors 105, 125, reflective secondary light redirecting surfaces 110, 135, lens assemblies 115, 130, and a central reflective surface 120 which may all be mounted to a substrate 150. FIG. 1B illustrates a cross-sectional side view of an embodiment of a folded optic sensor array including central prisms 141, 146 for primary light redirecting surfaces 122, 124 and additional prisms forming secondary light redirecting surfaces 135, 110.

Referring to FIG. 1A, the image sensors 105, 125 may include, in certain embodiments, a charge-coupled device (CCD), complementary metal oxide semiconductor sensor (CMOS), or any other image sensing device that receives light and generates image data in response to the received image. Image sensors 105, 125 may be able to obtain image data of still photographs and may also provide information regarding motion in a captured video stream. Sensors 105 and 125 may be individual sensors or may represent arrays of sensors, such as a 3×1 array. However, as will be understood by one skilled in the art, any suitable array of sensors may be used in the disclosed implementations.

The sensors 105, 125 may be mounted on the substrate 150 as shown in FIG. 1A. In some embodiments, all sensors may be on one plane by being mounted to the flat substrate 150. Substrate 150 may be any suitable substantially flat material. The central reflective surface 120 and lens assemblies 115, 130 may be mounted on the substrate 150 as well. Multiple configurations are possible for mounting a sensor array or arrays, a plurality of lens assemblies, and a plurality of primary and secondary reflective or refractive surfaces.

Still referring to FIG. 1A, in some embodiments, a central reflective surface 120 may be used to redirect light from a target image scene toward the sensors 105, 125. Central reflective surface 120 may be a mirror or a plurality of mirrors, and may be flat or shaped as needed to properly redirect incoming light to the image sensors 105, 125. For example, in some embodiments, central reflective surface 120 may be a mirror sized and shaped to reflect incoming light rays through the lens assemblies 115, 130 to sensors 105, 125, respectively. The central reflective surface 120 may split light comprising the target image into multiple portions and direct each portion at a different sensor. For example, a first side 122 of the central reflective surface 120 (also referred to as a primary light redirecting surface, as other embodiments may implement a refractive prism rather than a reflective surface) may send a portion of the light corresponding to a first field of view 140 toward the left sensor 105 while a second side 124 sends a second portion of the light corresponding to a second field of view 145 toward the right sensor 125. It should be appreciated that together the fields of view 140, 145 of the image sensors cover at least the target image.

In some embodiments in which the receiving sensors are each an array of a plurality of sensors, the central reflective surface may be made of multiple reflective surfaces angled relative to one another in order to send a different portion of the target image scene toward each of the sensors. Each sensor in the array may have a substantially different field of view, and in some embodiments the fields of view may overlap. Certain embodiments of the central reflective surface may have complicated non-planar surfaces to increase the degrees of freedom when designing the lens system. Further, although the central surface is discussed as being a reflective surface, in other embodiments central surface may be refractive. For example, central surface may be a prism configured with a plurality of facets, where each facet directs a portion of the light comprising the scene toward one of the sensors.

After being reflected off the central reflective surface 120, the light may propagate through lens assemblies 115, 130 as illustrated in FIG. 1A. One or more lens assemblies 115, 130 may be provided between the central reflective surface 120 and the sensors 105, 125 and reflective surfaces 110, 135. The lens assemblies 115, 130 may be used to focus the portion of the target image which is directed toward each sensor.

In some embodiments, each lens assembly may comprise one or more lenses and an actuator for moving the lens among a plurality of different lens positions through a housing. The actuator may be a voice coil motor (VCM), micro-electronic mechanical system (MEMS), or a shape memory alloy (SMA). The lens assembly may further comprise a lens driver for controlling the actuator.

Traditional auto focus techniques may be implemented by changing the focal length between the lens 115, 130 and corresponding sensor 105, 125 of each camera. In some embodiments, this may be accomplished by moving a lens barrel. Other embodiments may adjust the focus by moving the central mirror up or down or by adjusting the angle of the mirror relative to the lens assembly. Certain embodiments may adjust the focus by moving the side mirrors over each sensor. Such embodiments may allow the assembly to adjust the focus of each sensor individually. Further, it is possible for some embodiments to change the focus of the entire assembly at once, for example by placing a lens like a liquid lens over the entire assembly. In certain implementations, computational photography may be used to change the focal point of the camera array.

As illustrated in FIG. 1A, multiple side reflective surfaces, such as reflective surfaces 110 and 135, can be provided around the central mirror 120 opposite the sensors. After passing through the lens assemblies, the side reflective surfaces 110, 135 (also referred to as a secondary light redirecting surface, as other embodiments may implement a refractive prism rather than a reflective surface) can reflect the light ("downward" in orientation as depicted in FIG. 1A) onto the flat sensors 105, 125. As depicted, sensor 105 may be positioned beneath reflective surface 110 and sensor 125 may be positioned beneath reflective surface 135. However, in other embodiments, the sensors may be above the side reflected surfaces, and the side reflective surfaces may be configured to reflect light upward. Other suitable configurations of the side reflective surfaces and the sensors are possible in which the light from each lens assembly is redirected toward the sensors. Certain embodiments may enable movement of the side reflective surfaces 110, 135 to change the focus or field of view of the associated sensor.

Each sensor's field of view 140, 145 may be steered into the object space by the surface of the central mirror 120 associated with that sensor. Mechanical methods may be employed to tilt the mirrors and/or move the prisms in the array so that the field of view of each camera can be steered to different locations on the object field. This may be used, for example, to implement a high dynamic range camera, to increase the resolution of the camera system, or to implement a plenoptic camera system. Each sensor's (or each 3×1 array's) field of view may be projected into the object space, and each sensor may capture a partial image comprising a portion of the target scene according to that sensor's field of view. In some embodiments, the fields of view 140, 145 for the opposing sensor arrays 105, 125 may overlap by a certain amount 150. To reduce the overlap 150 and form a single image, a stitching process as described below may be used to combine the images from the two opposing sensor arrays 105, 125. Certain embodiments of the stitching process may employ the overlap 150 for identifying common features in stitching the partial images together. After stitching the overlapping images together, the stitched image may be cropped to a desired aspect ratio, for example 4:3 or 1:1, to form the final image.

FIG. 1B illustrates a cross-sectional side view of another embodiment of a folded optic array camera 100B. As shown in FIG. 1B, a sensor assembly 100B includes a pair of image sensors 105, 125 each mounted to substrate 150. The sensor assembly 100B also includes lens assemblies 115, 130 corresponding to image sensors 105, 125, respectively, optical component 116, 117 that each include a secondary light redirecting surface 110, 135, respectively, positioned adjacent to the cover glass 106, 126 of image sensors 105, 125, respectively. In some embodiments, the cover glass 106, 126 is physically coupled to the sensor 105, 125 and to the optical components 116, 117. Some embodiments include a lens 127, 129 disposed between the cover glass 106, 126 and the optical components 116, 117. In some embodiments, one side of the cover glass 106, 126 is physically coupled to the sensor 105, 125 the other side is physically coupled to the lens 127, 129. In some embodiments such a lens 127, 129 is further physically coupled to the optical component 116, 117. For example, in some embodiments the image sensor 105, 125, the cover glass 106, 117 and lens 127, 129 form a stack that is physically coupled together and coupled to the optical component 116, 117 for fixing their alignment to a known arrangement. Some embodiments do not include lens 127, 129. The primary light redirecting surface 122 of refractive prism 141 directs a portion of light from the target image scene along optical axis 121 through the lens assembly 115, is redirected off of the secondary light redirecting surface 110, passes through the cover glass 106, and is incident upon the sensor 105. The primary light redirecting surface 124 of refractive prism 146 directs a portion of light received from the target image scene along optical axis 123 through the lens assembly 130. Light is redirected off of the secondary light redirecting surface 135, passes through the cover glass 126, and is incident upon the sensor 125. The folded optic array camera 100B is illustrative of one array camera embodiment implementing refractive prisms instead of the reflective surfaces of the array camera 100A of FIG. 1A. Each of the refractive prisms 141, 146 is provided in an aperture in the substrate 150 such that the primary light directing surfaces 122, 124 are below the plane formed by substrate and receive light representing the target image scene.

The sensors 105, 125 may be mounted on the substrate 150 as shown in FIG. 1B. In some embodiments, all sensors may be on one plane by being mounted to the flat substrate 150. Substrate 150 may be any suitable substantially flat material. The substrate 150 can include an aperture as described above to allow incoming light to pass through the substrate 150 to the primary light redirecting surfaces 122, 124. Multiple configurations are possible for mounting a sensor array or arrays, as well as the other camera components illustrated, to the substrate 150.

Still referring to FIG. 1B, primary light redirecting surfaces 122, 124 may be prism surfaces as illustrated, or may be a mirror or a plurality of mirrors, and may be flat or shaped as needed to properly redirect incoming light to the image sensors 105, 125. In some embodiments the primary light redirecting surfaces 122, 124 may be formed as a central mirror pyramid or prism as illustrated in FIG. 1A. The central mirror pyramid, prism, or other optical component may split light representing the target image into multiple portions and direct each portion at a different sensor. For example, a primary light redirecting surface 122 may send a portion of the light corresponding to a first field of view toward the left sensor 105 while primary light redirecting surface 124 sends a second portion of the light corresponding to a second field of view toward the right sensor 125. In some embodiments in which the receiving sensors are each an array of a plurality of sensors, the light redirecting surfaces may be made of multiple reflective surfaces angled relative to one another in order to send a different portion of the target image scene toward each of the sensors. It should be appreciated that together the fields of view of the cameras cover at least the target image, and can be aligned and stitched together after capture to form a final image captured by the synthetic aperture of the array.

Each sensor in the array may have a substantially different field of view, and in some embodiments the fields of view may overlap. As described in more detail below, the spatial relationships between the various primary light redirecting surfaces 122, 124, lens assemblies 115, 130, and sensors 105, 125 can be predetermined to reduce or eliminate parallax and tilt artifacts occurring between the different fields of view.

As illustrated by FIGS. 1A and 1B, each array camera has a total height H. In some embodiments, the total height H can be approximately 4.5 mm or less. In other embodiments, the total height H can be approximately 4.0 mm or less. Though not illustrated, the entire array camera 100A, 100B may be provided in a housing having a corresponding interior height of approximately 4.5 mm or less or approximately 4.0 mm or less.

Some configurations of such array cameras 100A, 100B can suffer from parallax and tilt artifacts based on the relative positioning of the sensors and light redirecting surfaces, presenting challenges with respect to quality degradation due to parallax and tilt between different views of same object as seen from different cameras of the array. Parallax and tilt prevent seamless stitching of the images captured by each camera into a final image completely free of artifacts. Depending on depth (e.g., distance from lens to object) the image from one camera can be shifted in position and angle relative to an overlapping image from another camera. The resulting parallax and tilt can cause "double image" ghosting in the image area corresponding to the overlapping fields of view when the images are stitched or fused together. Even if the array is structured such that there is no overlap in sensor fields of view, parallax results in discontinuous features in the image, such as lines and edges, when such features cross over the borders between sensor fields of view.

As used herein, the term "camera" refers to an image sensor, lens system, and a number of corresponding light redirecting surfaces, for example the primary light redirecting surface 124, lens assembly 130, secondary light redirecting surface 135, and sensor 125 as illustrated in FIG. 1. A folded-optic multi-sensor array, referred to as an "array" or "array camera," can include a plurality of such cameras in various configurations. Some embodiments of array configurations are disclosed in U.S. Application Pub. No. 2014/0111650, filed Mar. 15, 2013 and titled "MULTI-CAMERA SYSTEM USING FOLDED OPTICS," the disclosure of which is hereby incorporated by reference. Other array camera configurations that would benefit from the geometric relationships for reduction or elimination of parallax artifacts described herein are possible.

Figure 2:
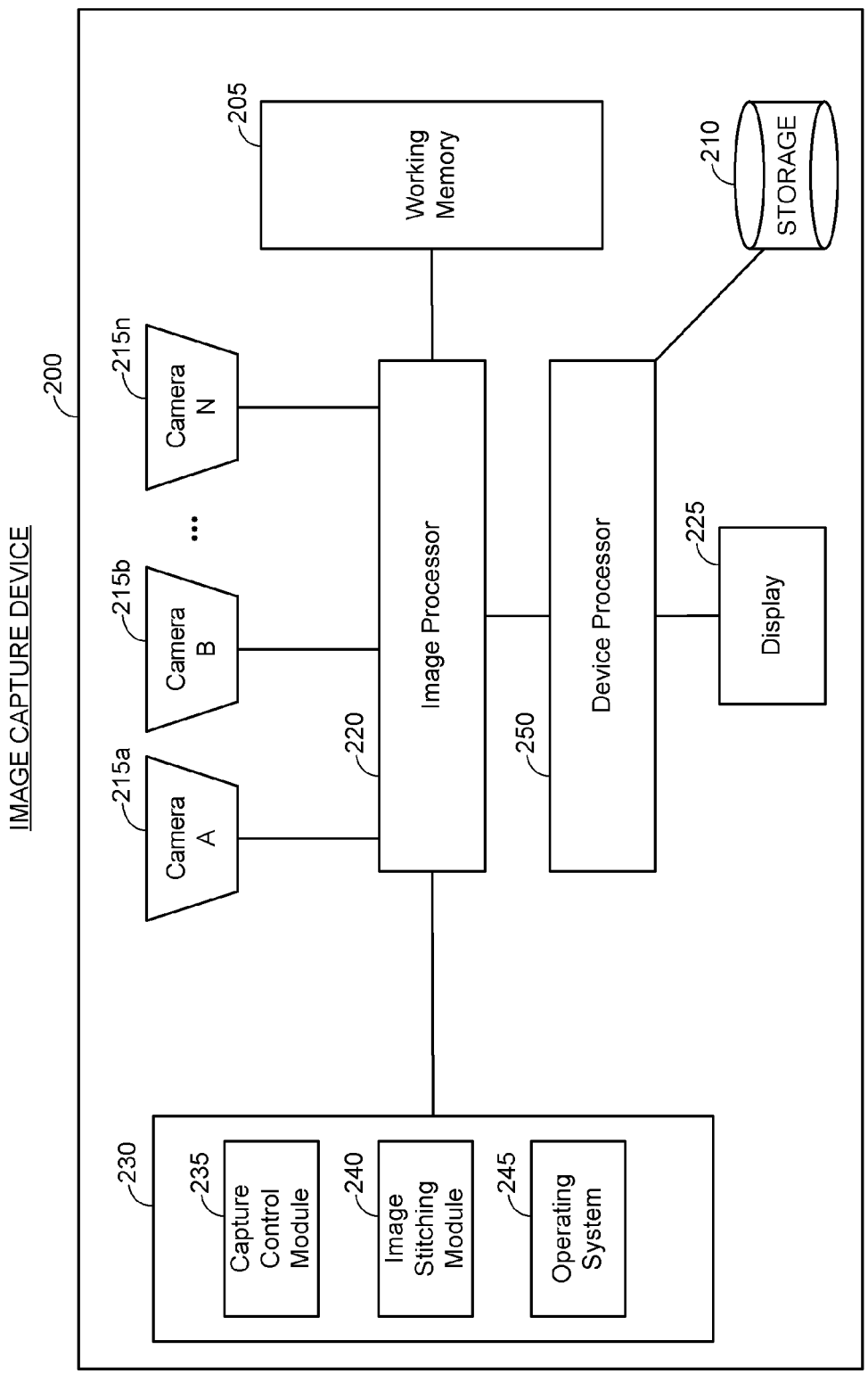
FIG. 2 illustrates a block diagram of one embodiment of an image capture device.

FIG. 2 depicts a high-level block diagram of a device 200 having a set of components including an image processor 220 linked to one or more cameras 215a-n. The image processor 220 is also in communication with a working memory 205, memory 230, and device processor 250, which in turn is in communication with storage 210 and electronic display 225.

Device 200 may be a cell phone, digital camera, tablet computer, personal digital assistant, or the like. There are many portable computing devices in which a reduced thickness imaging system such as is described herein would provide advantages. Device 200 may also be a stationary computing device or any device in which a thin imaging system would be advantageous. A plurality of applications may be available to the user on device 200. These applications may include traditional photographic and video applications, high dynamic range imaging, panoramic photo and video, or stereoscopic imaging such as 3D images or 3D video.

The image capture device 200 includes the cameras 215a-n for capturing external images. The cameras 215a-n may each comprise a sensor, lens assembly, and a primary and secondary reflective or refractive surface for redirecting a portion of a target image to each sensor, as discussed above with respect to FIG. 1. In general, N cameras 215a-n may be used, where N≥2. Thus, the target image may be split into N portions in which each sensor of the N cameras captures one portion of the target image according to that sensor's field of view. It will be understood that cameras 215a-n may comprise any number of cameras suitable for an implementation of the folded optic imaging device described herein. The number of sensors may be increased to achieve lower z-heights of the system, as discussed in more detail below with respect to FIG. 4, or to meet the needs of other purposes, such as having overlapping fields of view similar to that of a plenoptic camera, which may enable the ability to adjust the focus of the image after post-processing. Other embodiments may have a field of view overlap configuration suitable for high dynamic range cameras enabling the ability to capture two simultaneous images and then merge them together. The cameras 215a-n may be coupled to the image processor 220 to transmit captured image to the device processor 250.

The image processor 220 may be configured to perform various processing operations on received image data comprising N portions of the target image in order to output a high quality stitched image, as will be described in more detail below. Image processor 220 may be a general purpose processing unit or a processor specially designed for imaging applications. Examples of image processing operations include cropping, scaling (e.g., to a different resolution), image stitching, image format conversion, color interpolation, color processing, image filtering (e.g., spatial image filtering), lens artifact or defect correction, etc. Image processor 220 may, in some embodiments, comprise a plurality of processors. Certain embodiments may have a processor dedicated to each image sensor. Image processor 220 may be one or more dedicated image signal processors (ISPs) or a software implementation of a processor.

As shown, the image processor 220 is connected to a memory 230 and a working memory 205. In the illustrated embodiment, the memory 230 stores capture control module 235, image stitching module 240, and operating system 245. These modules include instructions that configure the image processor 220 of device processor 250 to perform various image processing and device management tasks. Working memory 205 may be used by image processor 220 to store a working set of processor instructions contained in the modules of memory 230. Alternatively, working memory 205 may also be used by image processor 220 to store dynamic data created during the operation of device 200.

As mentioned above, the image processor 220 is configured by several modules stored in the memories. The capture control module 235 may include instructions that configure the image processor 220 to adjust the focus position of cameras 215a-n. Capture control module 235 may further include instructions that control the overall image capture functions of the device 200. For example, capture control module 235 may include instructions that call subroutines to configure the image processor 220 to capture raw image data of a target image scene using the cameras 215a-n. Capture control module 235 may then call the image stitching module 240 to perform a stitching technique on the N partial images captured by the cameras 215a-n and output a stitched and cropped target image to imaging processor 220. Capture control module 235 may also call the image stitching module 240 to perform a stitching operation on raw image data in order to output a preview image of a scene to be captured, and to update the preview image at certain time intervals or when the scene in the raw image data changes.

Image stitching module 240 may comprise instructions that configure the image processor 220 to perform stitching and cropping techniques on captured image data. For example, each of the N sensors 215a-n may capture a partial image comprising a portion of the target image according to each sensor's field of view. The fields of view may share areas of overlap, as described above and below. In order to output a single target image, image stitching module 240 may configure the image processor 220 to combine the multiple N partial images to produce a high-resolution target image. Target image generation may occur through known image stitching techniques. Examples of image stitching can be found in U.S. patent application Ser. No. 11/623,050 which is hereby incorporated by reference in its entirety.

For instance, image stitching module 240 may include instructions to compare the areas of overlap along the edges of the N partial images for matching features in order to determine rotation and alignment of the N partial images relative to one another. Due to rotation of partial images and/or the shape of the field of view of each sensor, the combined image may form an irregular shape. Therefore, after aligning and combining the N partial images, the image stitching module 240 may call subroutines which configure image processor 220 to crop the combined image to a desired shape and aspect ratio, for example a 4:3 rectangle or 1:1 square. The cropped image may be sent to the device processor 250 for display on the display 225 or for saving in the storage 210.

Operating system module 245 configures the image processor 220 to manage the working memory 205 and the processing resources of device 200. For example, operating system module 245 may include device drivers to manage hardware resources such as the cameras 215a-n. Therefore, in some embodiments, instructions contained in the image processing modules discussed above may not interact with these hardware resources directly, but instead interact through standard subroutines or APIs located in operating system component 270. Instructions within operating system 245 may then interact directly with these hardware components. Operating system module 245 may further configure the image processor 220 to share information with device processor 250.

Device processor 250 may be configured to control the display 225 to display the captured image, or a preview of the captured image, to a user. The display 225 may be external to the imaging device 200 or may be part of the imaging device 200. The display 225 may also be configured to provide a view finder displaying a preview image for a use prior to capturing an image, or may be configured to display a captured image stored in memory or recently captured by the user. The display 225 may comprise an LCD or LED screen, and may implement touch sensitive technologies.

Device processor 250 may write data to storage module 210, for example data representing captured images. While storage module 210 is represented graphically as a traditional disk device, those with skill in the art would understand that the storage module 210 may be configured as any storage media device. For example, the storage module 210 may include a disk drive, such as a floppy disk drive, hard disk drive, optical disk drive or magneto-optical disk drive, or a solid state memory such as a FLASH memory, RAM, ROM, and/or EEPROM. The storage module 210 can also include multiple memory units, and any one of the memory units may be configured to be within the image capture device 200, or may be external to the image capture device 200. For example, the storage module 210 may include a ROM memory containing system program instructions stored within the image capture device 200. The storage module 210 may also include memory cards or high speed memories configured to store captured images which may be removable from the camera.

Although FIG. 2 depicts a device having separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance. In some embodiments, a device may include a single processor that can perform the functionality that is described in reference to the device processor 250 and the image processor 220.

Additionally, although FIG. 2 illustrates two memory components, including memory component 230 comprising several modules and a separate memory 205 comprising a working memory, one with skill in the art would recognize several embodiments utilizing different memory architectures. For example, a design may utilize ROM or static RAM memory for the storage of processor instructions implementing the modules contained in memory 230. The processor instructions may be loaded into RAM to facilitate execution by the image processor 220. For example, working memory 205 may comprise RAM memory, with instructions loaded into working memory 205 before execution by the image processor 220.

III. Overview of Folded Optic Array Cameras Free From Parallax and Tilt Artifacts FIGS. 3A and 3B illustrate an embodiment of an array camera free of parallax and tilt artifacts due to arrangement of the various components according to the predetermined spatial relationships defined below. As illustrated by FIGS. 3A and 3B, two mirror surfaces 330, 335 and two corresponding sensors 311A, 311B can be configured based on a predefined spatial relationship to avoid causing parallax and tilt artifacts in a captured image. A sensor of the array and its corresponding lens is referred to as a "camera," and the cooperation of all cameras in the array is referred to as a "virtual camera." Though not illustrated, each camera may have a secondary light redirecting surface as described above in order to redirect light toward a sensor that is not positioned at the illustrated angle relative to an optical axis of the camera. For example, in some embodiments all sensors may be positioned in a common plane. In the illustrated embodiment, the virtual camera 320 includes the virtual sensor 321 and the virtual lens 322 associated with the virtual sensor. As will be understood, the virtual camera 320 is depicted to show the virtual sensor 321 and the virtual lens 322 corresponding to the synthetic aperture (field of view 340) of the overall array 300 generated by stitching images captured by the physical sensors 311A, 311B, and the virtual camera is not physically present in an actual construction of the array.

Each camera 310A, 310B looks at the apex A of the central mirror prism 350, the optical axis 315A, 315B of each camera 310A, 310B passing through the apex A. The lens centers of the lenses 312A, 312B associated with each of the cameras 310A, 310B are at the same distance from the apex, and each camera 310A, 310B sees half the field of view 340 of the virtual camera 320. The angle of the optical axis 315A, 315B of each camera 310A, 310B relative to the vertical axis 325 can be double the angle of a plane formed by its corresponding mirror 330, 335 relative to the vertical axis 325. In the illustrated embodiment, the vertical axis 325 denotes the vertical axis of symmetry of the array 300 and is also the virtual optical axis (e.g., the optical axis of the virtual camera 320 represented by virtual sensor 321 and virtual lens 322).

As illustrated, the planes formed by the mirror surfaces 330, 335 intersect at a common point, referred to as the apex and labeled as A in the figures, along the virtual optical axis 325 of the array. The cameras 310A, 310B can be positioned so that the optical axis 315A, 315B of each camera intersects with the apex A. In addition, each camera 310A, 310B can be positioned such that the angle (labeled as angle $2\alpha$) formed between the camera's optical axis 315A, 315B and the virtual optical axis 325 is twice the angle (labeled as angle $\alpha$) formed between the corresponding mirror surface 330, 335 and the virtual optical axis 325. However, these angles do not have to be the same for all cameras in the array. The distance D between the apex A and the center of projection 313B (located within the lens 312B corresponding to a sensor 311B) can be the same or essentially the same for all the cameras in the array. All cameras 310A, 310B of the array virtually merge into (read "serve as") one single virtual camera 320 looking upward along the virtual optical axis 325 of the array 300. In this way each individual camera/lens/mirror combination represents only a sub-aperture of the total array 300. The virtual camera 320 has a synthetic aperture made of the sum of all individual aperture rays.

Figure 3C:
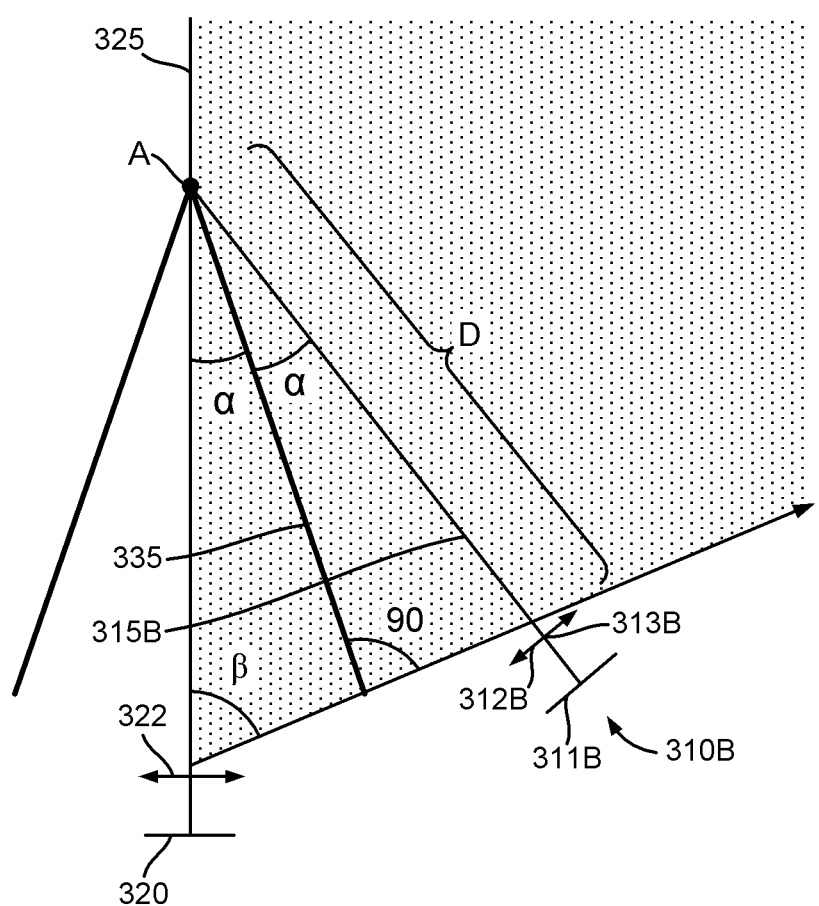

FIG. 3C illustrates an example of the above-described design constraints for one camera 310B in the array 300. The field of view 340 of the virtual camera 320 formed by stitching images from all cameras 310A, 310B in the array 300 can be based on optimization of the mechanical parameters of the system. However, a rough estimate can be obtained based on the assumption of an infinitely small (point-size) individual camera 310B. The maximum possible field of view (FOV) for the virtual camera 320 is related to angles in FIG. 3C, where:

$FOV=2\beta$ $\beta=90-\alpha$ $FOV=180-2\alpha$

Beyond the angle $\beta$, the light rays that the virtual camera 320 "sees" can be obstructed by the physical structure of the real camera 310B. In some embodiments of array cameras, the FOV may be smaller.

Additionally, the array camera is desirably thin (e.g., 4 mm or less in height) in some embodiments, which constrains the angle $\alpha$ to less than 45° and to more than a certain value. Other practical requirements may make $\alpha>30°$. In various embodiments, the focal length and angle $\alpha$ do not have to be the same for all cameras.

Figure 4:
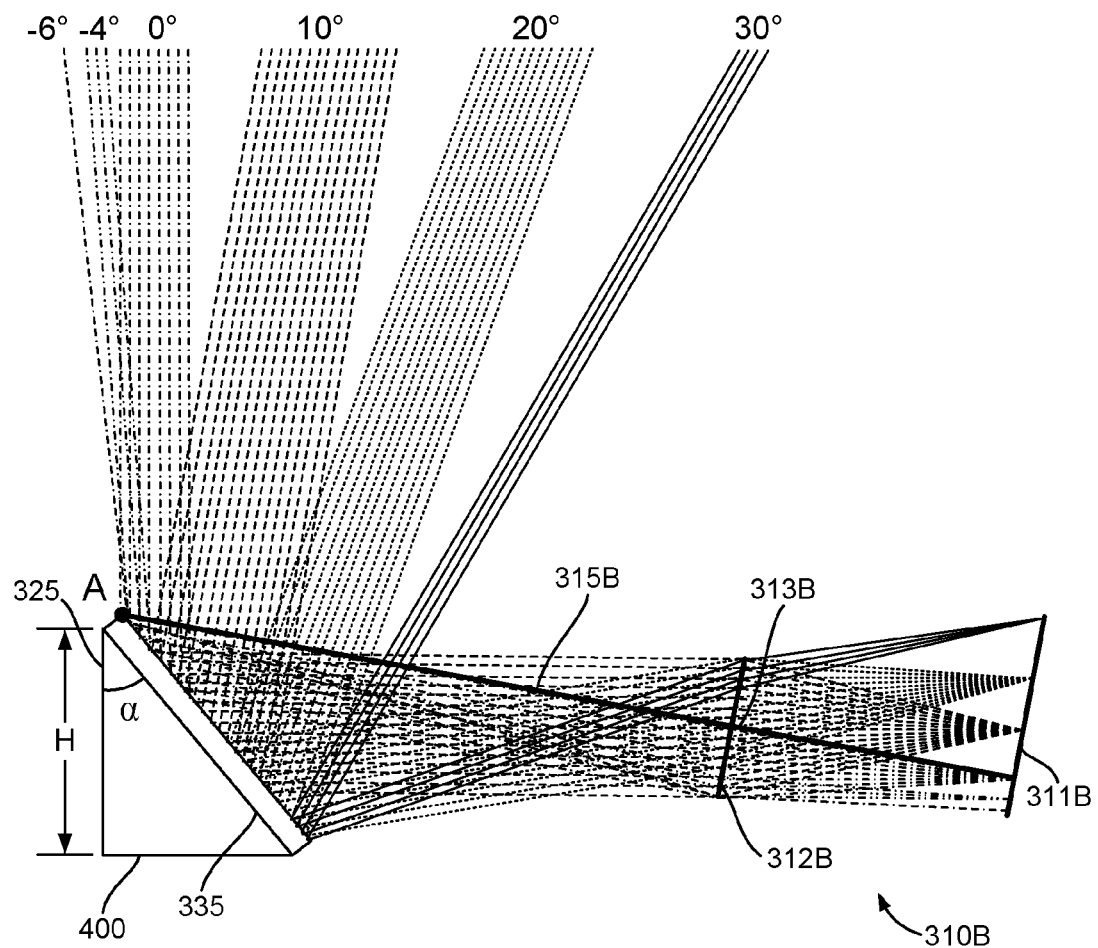
FIG. 4 illustrates an example of design parameters for one sensor and mirror of the array camera.

FIG. 4 illustrates an example of design parameters and an example ray trace for various angles of light incident on a mirror 335 corresponding to one sensor 311B and mirror 335 of the array camera 300 of FIGS. 3A-3C, which can result in a FOV=60° (approximately). However, this is an example and not a limitation and wider angles are realistically possible. Assuming an ideal lens 312B, with similar results expected for a real lens, the focal length of the camera 310B is approximately 5 mm, the aperture is 2.5 mm, the distance from A to lens 312B center of projection 313B is approximately 10.9 mm, A is at approximately 4 mm height H from the base 400 (though the height H can vary based on the overall thickness or height for the array), the lens center of projection 313B is at approximately 2 mm height from the base 400, and α=40°. A FOV=60° can be determined from computing relative illumination, and can be constrained by the mirror 335 size and distance from lens center of projection 313B to the mirror 335. The constraint of a mirror height H of approximately 4 mm may not be increased due to form factor limitations of the array camera, while the distance to the mirror 335 can be reduced, but at the cost of physical camera obstructing some of the rays. As illustrated, the sensor 311B can be positioned off-center from the optical axis 315B in order to gather light from more of the field of view provided by the mirror than if the sensor 311B was conventionally positioned centered with the optical axis 315B. In other embodiments, the sensor may be positioned in a different position and at a different angle relative to the optical axis and a secondary light redirecting surface can be included to redirect the light into the sensor. For example, the base 400 of the central mirror pyramid may be positioned on (or inset into) a substrate, and the sensor 311B (and all other sensors in the array 300) may be positioned on (or inset into) the substrate.

IV. Overview of Prism Array Camera

Figure 5A:
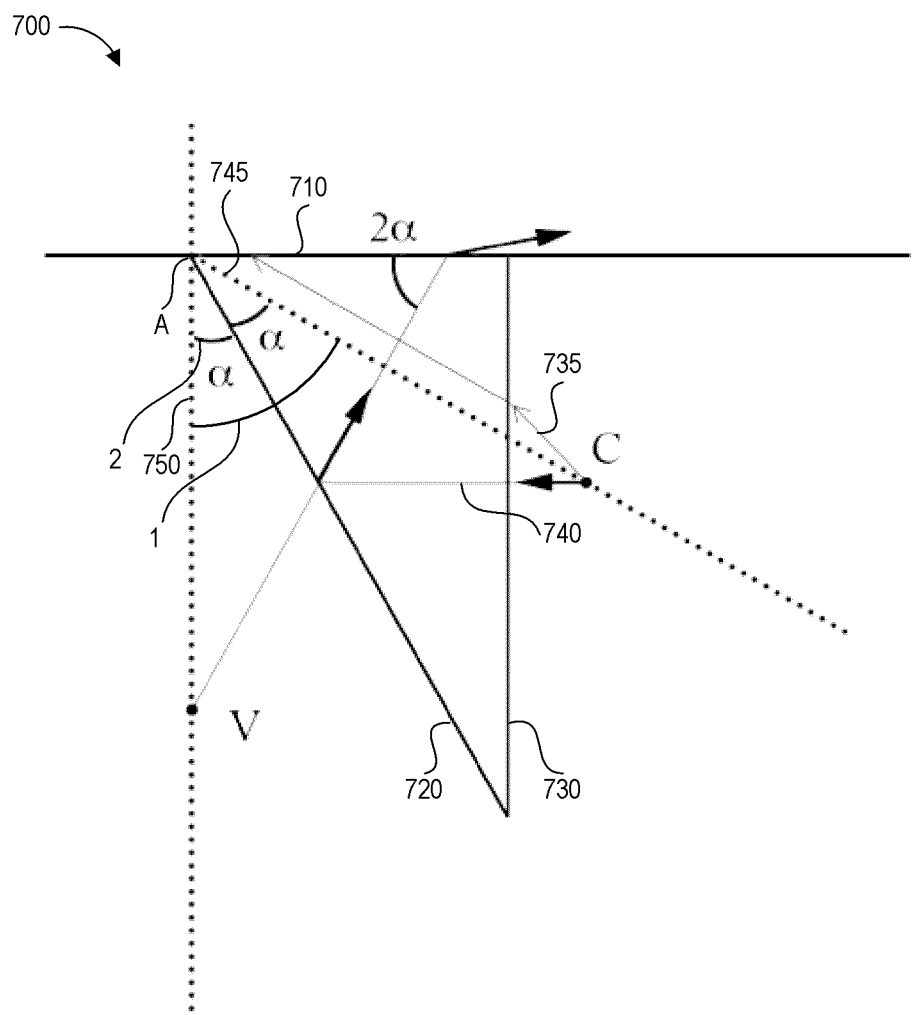
FIGS. 5A-5C illustrate an embodiment of a prism for a prism array camera.
Figure 5B:
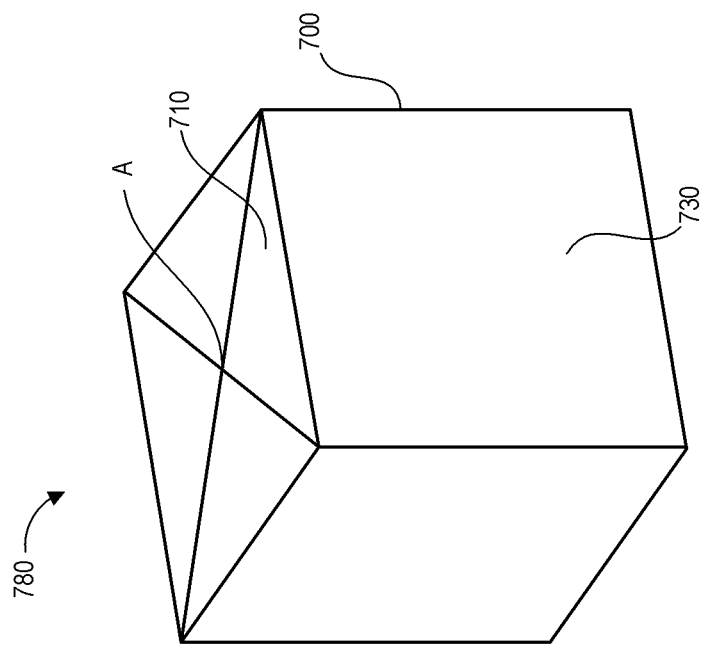
Figure 5B:
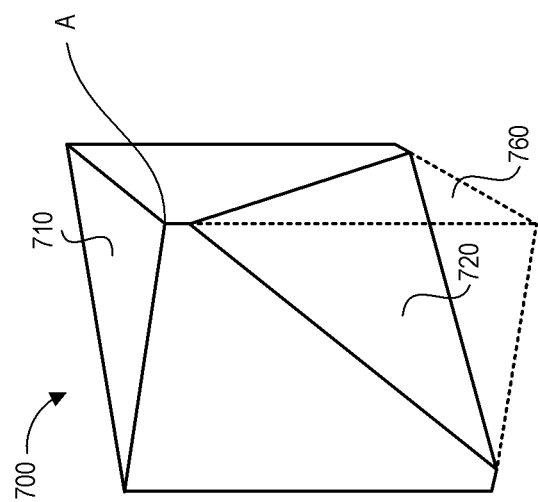
Figure 5C:
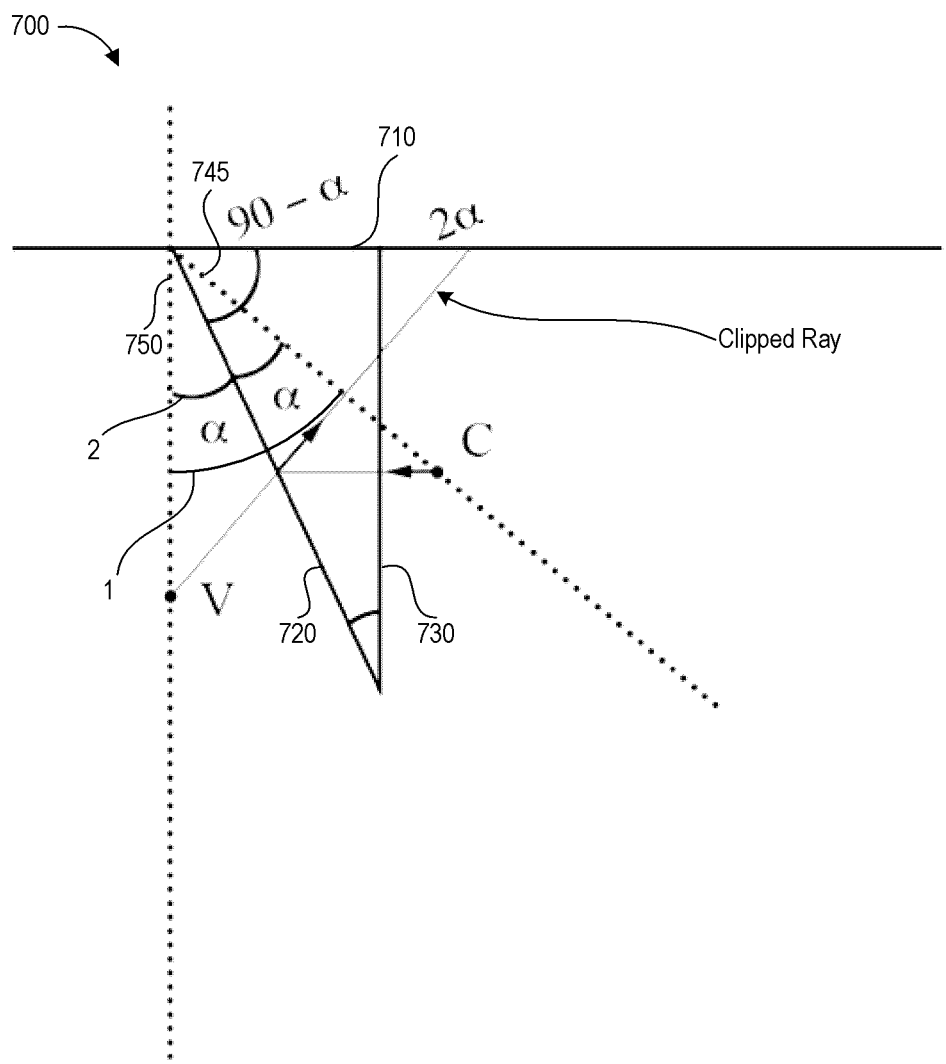

FIGS. 5A-5C illustrate an embodiment of a prism for a prism array camera. FIG. 5A illustrates a cut-away side view of the prism 700 having a top surface 710 (also referred to as the first surface) positioned orthogonally to the array camera vertical axis of symmetry 750 (also referred to as the virtual optical axis of virtual camera V), a lower interior surface 720 (also referred to as the second surface) of the prism 700 positioned at an angle α relative to the vertical axis of symmetry 750, and a lower exterior surface 730 (also referred to as the third surface) positioned orthogonally to the top surface 710. The first surface 710 can be positioned such that light representing at least a portion of the target image scene enters prism 700 through the first surface 710. The second surface 720 can be positioned at angle 2 with respect to the virtual optical axis 750 in order to redirect light received from the first surface 710 toward the third surface 730, where angle 2 has an angular value of α. The third surface 730 can be facing the corresponding camera, C, such that light passing through the prism 700 exits the third surface 730 and enters the camera C.

V represents a virtual camera, the image of camera C based on the folded optics of the imaging system. A represents the "apex" of the prism 700 located along the vertical axis of symmetry 750, which is also the optical axis of the virtual camera V. C represents a camera located anywhere along the camera optical axis 745 outside of the prism 700, where the camera optical axis 745 is positioned at the angle α relative to the second surface 720 of the prism 700 and at angle 1 relative to the virtual optical axis 750, where angle 1 has an angular value of 2α. Though illustrated as a point for purposes of simplicity and clarity, camera C can include multiple components, for example a lens assembly 130, secondary light redirecting surface 135, and sensor 125 as illustrated in FIG. 1A. The prism 700 can be used as the refractive prisms 141, 146 illustrated in FIG. 1B in some examples.

In some embodiments, a material having a refractive index n=2 can be used for the prism 700. In other embodiments, a material having a refractive index of n≥1.5 can be used for the prism 700. For example, high-index glass can be a suitable material from which to construct prism 700. The prism can be carved, cut, or molded from the suitable material. In some embodiments, the second surface 720 of the prism 700 can be coated with a reflective material, for example aluminum or another metal, to enhance the reflective properties of that surface.

The angle α=30° when n=2 in some examples. Due to the total internal reflection properties of a material having a refractive index of n=2, any light rays entering the prism through the right surface 730 that hits the top surface 710 at an angle larger than α=30° will be reflected back into the prism from the top surface 710. Rays coming from the camera slightly above the dotted line representing the camera optical axis hit the surface 710 at the angle above that of total internal reflection and don't come out (as illustrated by the example ray 735). Accordingly, the camera sees nothing above the top left corner A of the prism. No light from the image scene enters into the camera aperture from that position/direction. Though rays may be illustrated and discussed as coming "from" the camera in the examples provided herein to illustrate the field of view of the camera, it will be appreciated that in practice the rays may originate in the target image scene and pass through the prism before entering camera C.

A generally horizontal ray (as illustrated by the example ray 740) hits the second surface 720 at angle of total internal reflection, 2α=60°, and exits the prism horizontally. Other rays above it coming out of C exit the prism from different angles up to vertical. Accordingly, this camera covers a FOV of approximately 90°, and an array of such cameras would cover FOV of approximately 180°.

FIG. 5B illustrates a perspective view of the prism 700 shown individually and a perspective view of an assembly 780 of four prisms, such as could be used in a four-camera prism array camera. The illustrated configuration is provided as an example of a prism assembly, and in other embodiments two, three, five or more prisms 700 could be used in the assembly. As shown, the apex A of each individual prism can be positioned substantially adjacent to the apex of each other prism, and the top surfaces 710 may be coplanar. The third surface 730 of each prism 700 forms an outer side of the assembly 780 such that, in the illustrated example having four prisms, light entering the assembly 780 through the top surfaces 710 is redirected outward in four directions through the third surfaces 730. Although the assembly 780 appears solid, the angled second surfaces 720 of the prisms form an empty pyramid-shaped recess in the prism assembly 780, one portion of which is illustrated as negative space 760 associated with prism 700. The recess can be empty or filled in various embodiments, for example with a reflective backing or reflective solid. As used herein, a "reflective backing" can refer to one or more materials including a reflective material applied as a backing or coating to a surface of the prism. For example, by adhering, spraying, painting, depositing by vacuum deposition, or otherwise applying the material to the prism, a thin layer of metal, film, or other reflective material can be provided on the second surface 720 of the prism such that a reflective side of the material is adjacent to the outer side (that is, outside of the prism) of the second surface 720.

FIG. 5C illustrates potential issues that may face a prism array camera using the prism 700. To illustrate the issues, consider an example of the prism made of BK7 glass. The refractive index n=1.5 of the BK7 glass leads to α=24°. One potential issue is that in many cases some rays (see example ray 770) get clipped by the prism itself so the FOV is limited to around 60°, as illustrated in FIG. 7C. This can still produce an array camera having a FOV of around 120°. Another potential issue is that the prism is dispersive, and therefore an image captured by camera C seeing an image scene "through" the prism 700 can have chromatic aberrations. Chromatic aberrations can visually present as colorful and/or blurry artifacts, for example blurring in a direction of colorization due to dispersion.

Figure 6A:
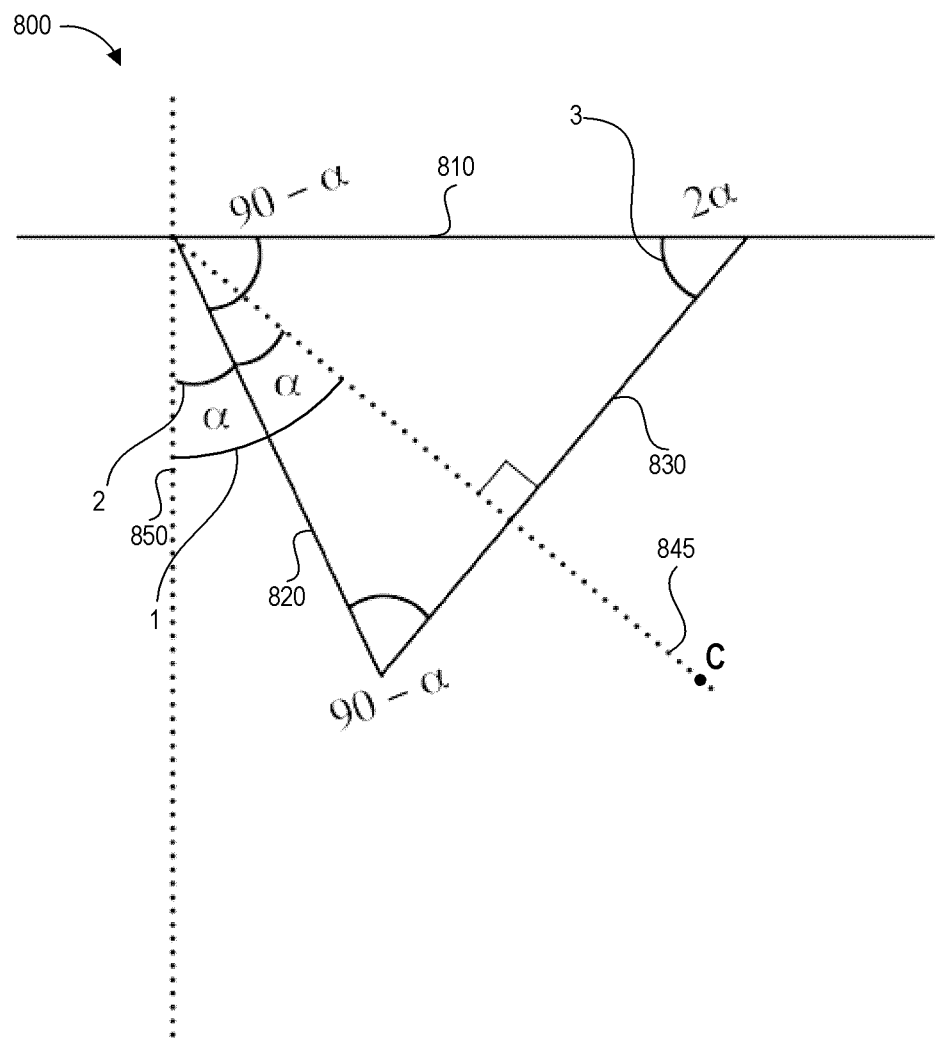
FIGS. 6A-6C illustrate another embodiment of a prism for a prism array camera.
Figure 6B:
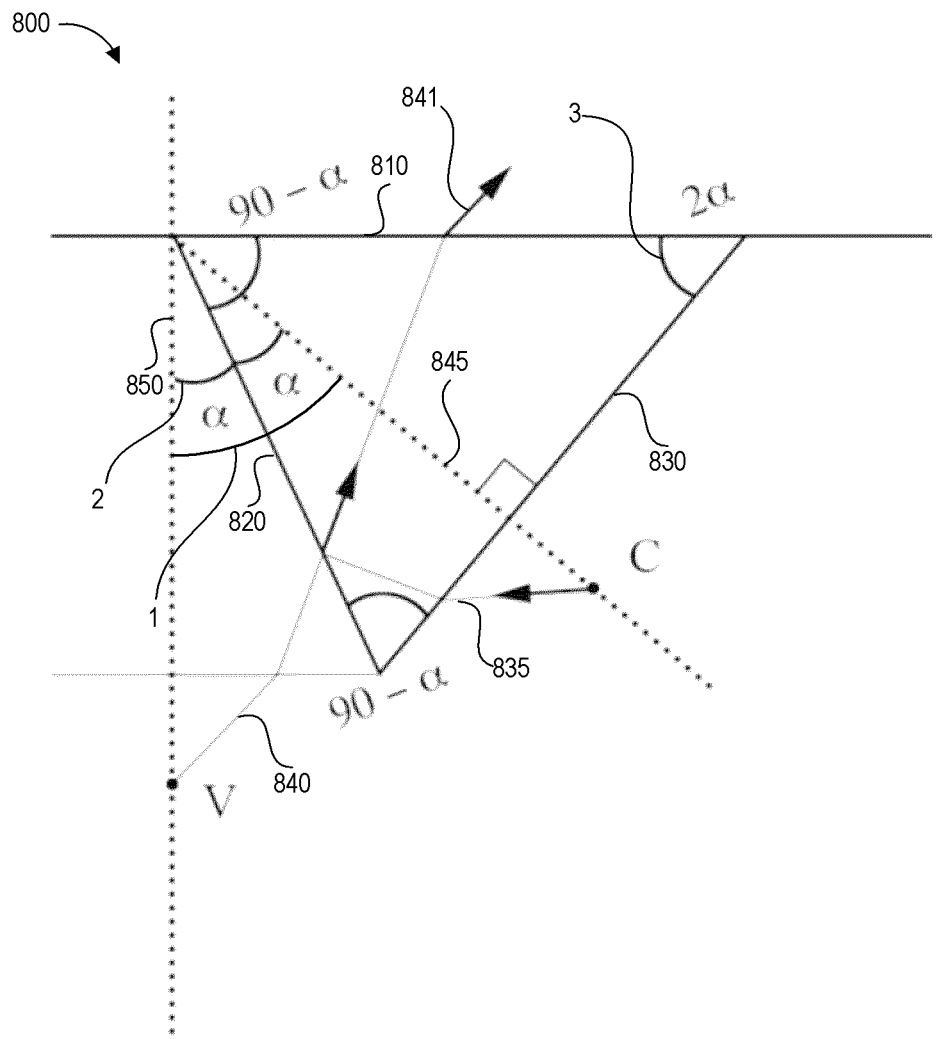
Figure 6C:
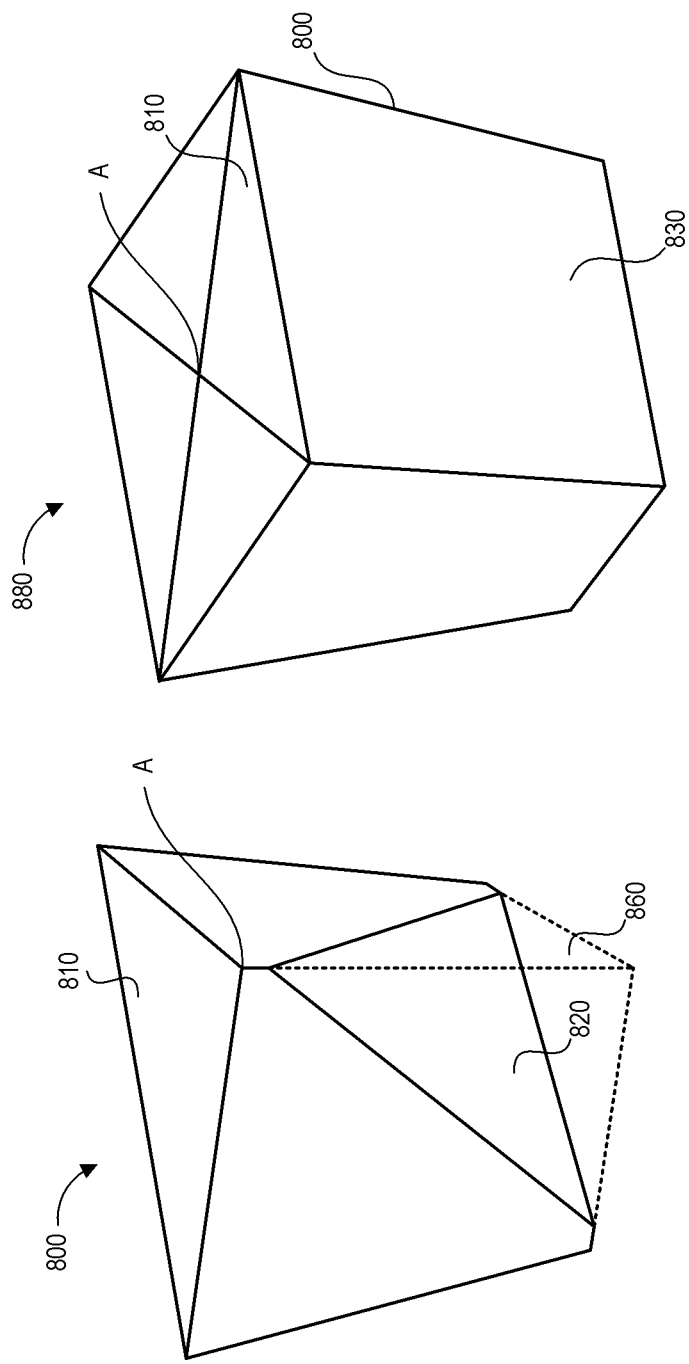

FIGS. 6A-6C illustrate another embodiment of a prism for a prism array camera that addresses the FOV limitation and chromatic aberration issues of the camera of FIGS. 5A-5C. The prism 800 (also referred to as an optical element) both reflects and refracts due to its symmetry, compensating for the above-described issues with the prism of FIGS. 5A-5C, by having a cross sectional area formed as an isosceles triangle, where the length of the first surface 810 and the third surface 830 are substantially the same. Light from at least a portion of a target image scene enters the optical element through the first surface (at which point it may be refracted), is redirected off of the second surface toward the third surface, and exits the optical element through the third surface to pass on toward the camera C.

The angular value of angle α formed between the first surface 810 and the second surface 820 and the angular value of the angle formed between the second surface 820 and the third surface 830 are substantially the same, and can be equal to 90-α. The angular value of angle 2 formed between the second surface 820 and the vertical axis of symmetry 850 (also the virtual optical axis) can be equal to the angular value of angle α formed between the second surface 820 and the camera optical axis 845. Accordingly, a plane formed by the second surface 820 bisects angle 1 formed between the virtual optical axis 850 and the camera optical axis 845, and angle 1 has an angular value of twice the angular value of angle 2. Angle 3, formed between the first surface 810 and the third surface 830 has an angular value of twice the angular value of angle 1. The vertical axis of symmetry 850 and camera optical axis 845 can intersect at the apex A of the prism 800. The prism 800 can be used as the refractive prisms 141, 146 illustrated in FIG. 1B in some examples.

FIG. 6A illustrates a cut-away side view of the prism 800 having a first (or top) surface 810 positioned orthogonally to the array camera vertical axis of symmetry 850, a second (or lower interior) surface 820 of the prism 800 positioned at an angle α relative to the vertical axis of symmetry, and a third (or lower exterior) surface 830 positioned at an angle 2α relative to the first surface 810. In some embodiments, the second surface 820 may be provided with a reflective backing, or a reflective material may be positioned adjacent to the second surface 820. The third surface 830 can be positioned facing the corresponding camera to pass the portion of light received by the prism 800 to the camera. The camera (not shown in FIG. 6A) can be located anywhere on the camera optical axis 845 outside of the prism 800.

According to the parallax and tilt-free design principles described above, the camera optical axis 845 is angled at an angle 2α relative to the vertical axis of symmetry and passes through the apex A of the prism. The center of projection of the virtual camera can be located along the vertical axis of symmetry 850. Although illustrated as a cut-away side view, it will be appreciated that planes formed by each of the first surface, second surface, and third surface adhere to the geometric relationship for reducing or eliminating parallax and tilt artifacts in images captured in a prism array camera implementing the prisms.

Such prisms have no dispersion, and therefore do not cause chromatic aberration. FIG. 6B illustrates example light rays 835 traveling through the prism 800. The camera C and virtual camera V are illustrated in FIG. 6B.

The prism 800 is equivalent to a slab of glass with parallel top and bottom surfaces, as seen from the perspective of the virtual camera V, where V is the mirror image of the real camera C due to the folded optics of the prism 800. Because there are no chromatic issues with light traveling through a glass plate with parallel surfaces, the prism 800 also presents no chromatic aberration in captured images. The horizontal ray 835 coming from C is equivalent to the ray 840 coming out of virtual camera V as illustrated. The ray, as shown by ray segment 841, exits the prism parallel to the direction it entered from V (represented by ray segment 840).

Further, no ray is clipped: as long as the ray enters the prism, it also exits. As a result the FOV of the camera is preserved. An array of cameras, each having FOV=60°, will cover 120°. A FOV for the array camera up to 180° is possible if V is touching the plate and a is the angle of total internal reflection.

FIG. 6C illustrates a perspective view of the prism 800 shown individually and a perspective view of an assembly 880 of four prisms 800, such as could be used in a four-camera prism array camera. The illustrated configuration is provided as an example of a prism assembly, and in other embodiments two, three, five or more prisms could be used in the assembly. As shown, the apex A of each individual prism 800 can be positioned substantially adjacent to the apex of each other prism, and the top (first) surfaces may be coplanar. The third surface 830 of each prism 800 forms an outer side of the assembly 880 such that, in the illustrated example having four prisms, light entering the assembly 880 through the top surfaces 810 is redirected outward in four directions through the third surfaces 830. Although the assembly 880 appears solid, the angled lower interior (second) surfaces 820 of the prisms form an empty pyramid-shaped recess in the prism assembly 880, a portion of which is shown by negative space 860 associated with prism 800. The recess can be empty or filled in various embodiments, for example with a reflective backing or reflective solid.

Each prism in the assembly 880 can be manufactured to have facets positioned according to the geometric relationship defined above to produce parallax and tilt free images. The angle of the lower exterior (third) surfaces can cause the assembly 880 to appear to have tilted sides.

Figure 7A:
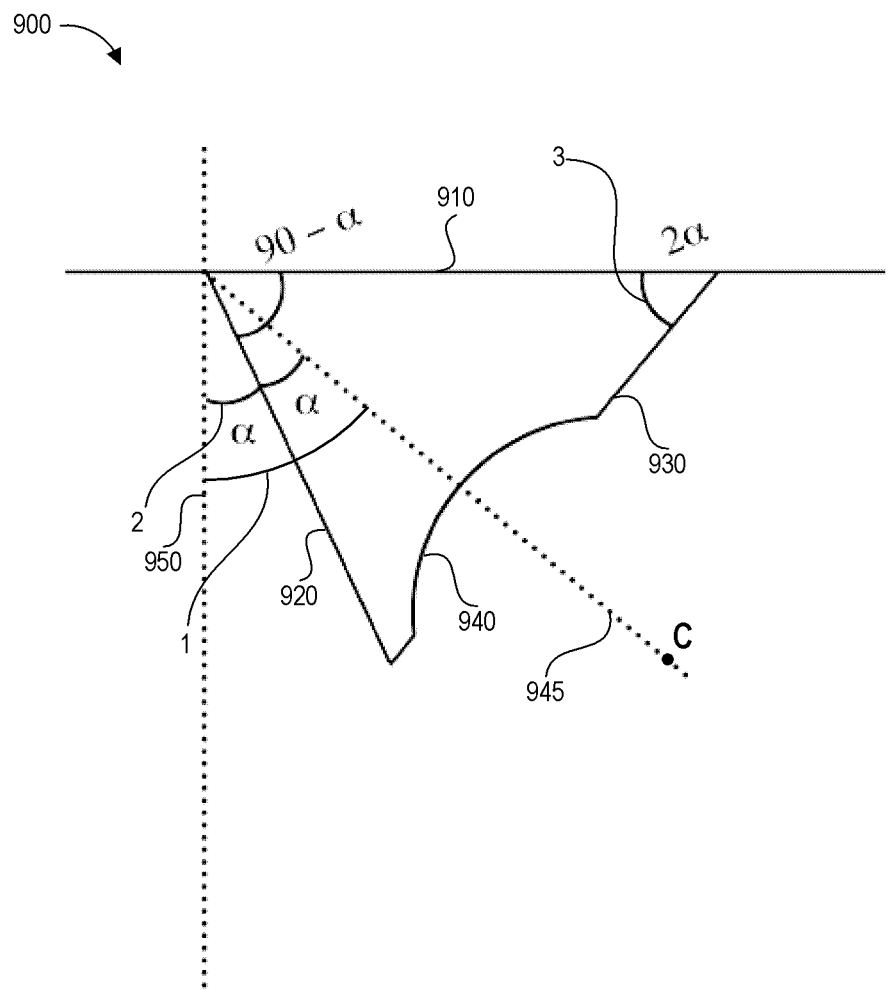
FIGS. 7A-7C illustrate another embodiment of a prism for a prism array camera.
Figure 7B:
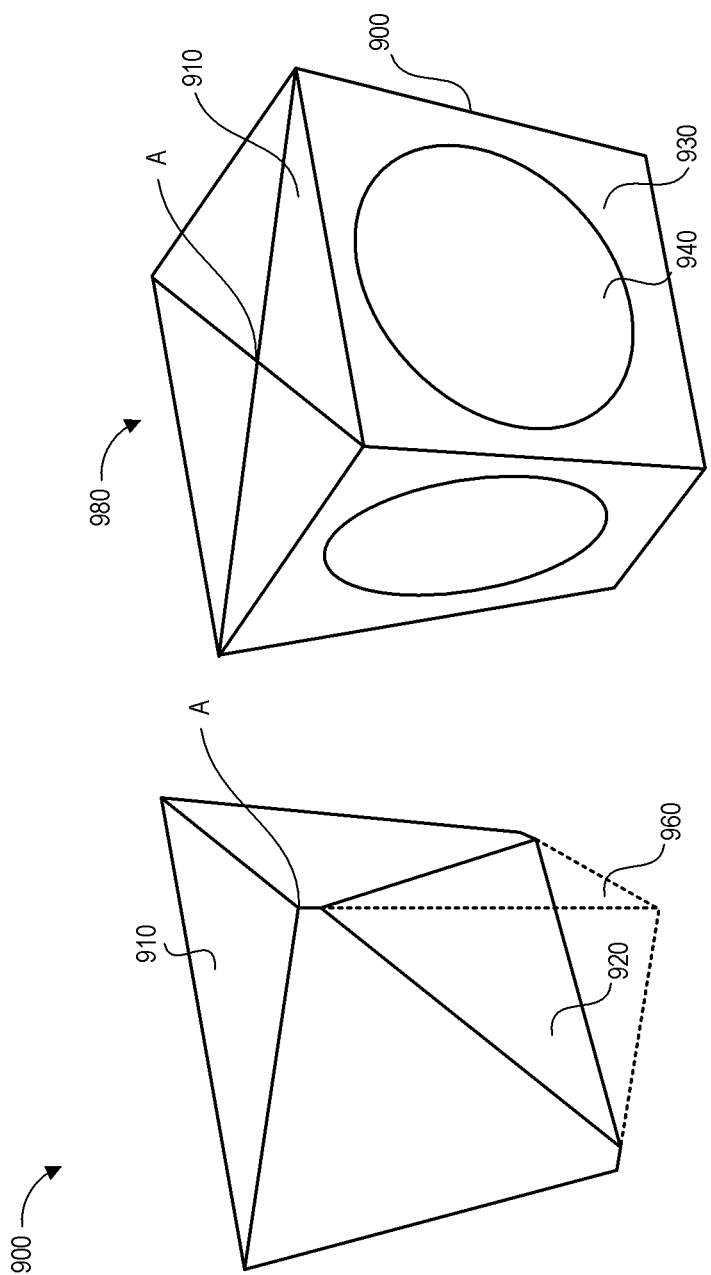
Figure 7C:
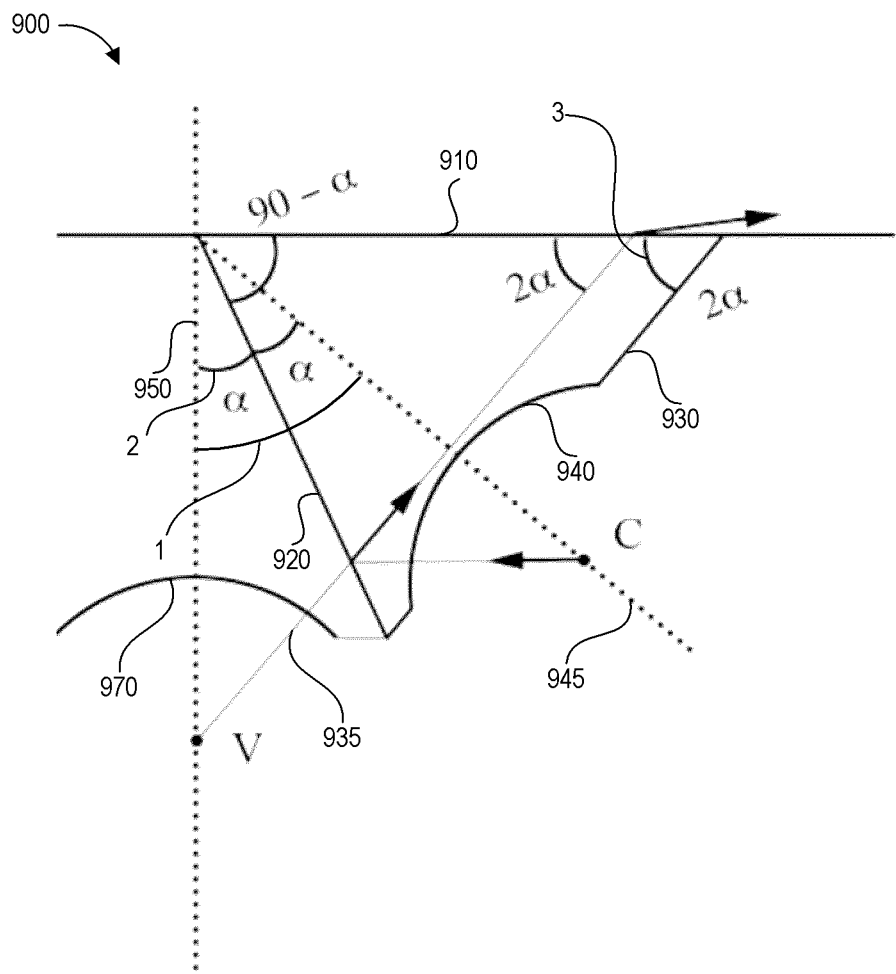

FIGS. 7A-7C illustrate another embodiment of a prism 900 for a prism array camera having a planoconcave lens 940, also referred to as a negative lens. Incorporation of the lens 940 into the isosceles prism design described above with respect to FIGS. 6A-6C can further increase the FOV of the camera.

FIG. 7A illustrates a cut-away side view of the prism 900 having a first surface 910 positioned orthogonally to the array camera vertical axis of symmetry 950, a second surface 920 of the prism 900 positioned at an angle α relative to the vertical axis of symmetry 950, a camera optical axis 945 positioned at an angle 2α relative to the vertical axis of symmetry 950, and a third surface 930 positioned at an angle 2α relative to the first surface 910. The third surface 930 can be facing the corresponding camera. The camera (not shown in FIG. 7A) can be located anywhere on the camera optical axis 945 outside of the prism 900. According to the parallax and tilt-free design principles described above, the camera optical axis 945 is angled at an angle 2α relative to the vertical axis of symmetry and passes through the apex A of the prism. The center of projection of the virtual camera can be located along the vertical axis of symmetry 950 also passing through the apex A. The prism 900 can be used as the refractive prisms 141, 146 illustrated in FIG. 1B in some examples.

A negative lens 940 is illustrated as being formed in the third surface 930. The negative lens 940 can be carved or cut from the prism 900 or can be molded or otherwise formed with the prism 900 in various embodiments. In other embodiments, the third surface may be flat and the negative lens may be coupled to the surface, for example by adhesive. A lens carved into the prism 900 can be more suitable for use with a thin form-factor array camera.

This lens 940 should be considered as part of the total optical design and optimized together with the lens assembly that would be used to focus the camera. Such a lens 940 increases FOV by spreading out the rays traveling toward the camera. In one example, the lens surface can be part of a sphere centered at the center of projection. All rays enter perpendicular and are not refracted. Even when the rays cover a small angle inside the glass, when they exit through the flat surface of the lens 940 the angle increases. When the angle of the ray is close to total internal reflection, the exit angle increases significantly.

FIG. 7B illustrates a perspective view of the prism 900 shown individually and a perspective view of an assembly 980 of four prisms 900, such as could be used in a four-camera prism array camera. The illustrated configuration is provided as an example of a prism assembly, and in other embodiments two, three, five or more prisms could be used in the assembly. As shown, the apex A of each individual prism can be positioned substantially adjacent to the apex of each other prism, and the top (first) surfaces 910 may be coplanar. The third surface 930 of each prism 900 forms an outer side of the assembly 980 such that, in the illustrated example having four prisms, light entering the assembly 980 through the top surfaces 910 is redirected outward in four directions through the third surfaces 930. Although the assembly 980 appears solid, the angled lower interior (second) surfaces 920 of the prisms form an empty pyramid-shaped recess in the prism assembly 980, one portion of which is illustrated as negative space 960 associated with prism 900. The recess can be empty or filled in various embodiments, for example with a reflective backing on second surface 920 or with a reflective solid. The angle of the third surfaces 930 can cause the assembly 980 to appear to have tilted sides. Third surfaces 930 show the negative lenses 940 in the sides.

FIG. 7C illustrates a representation of the concept of FIG. 7A from the point of view of the virtual camera V. FIG. 7C shows a ray 935 entering the prism 900 through a virtual negative lens 970 (corresponding to the mirror image of negative lens 940) from virtual camera V at angle 90-α without bending, and reaching the first surface 910 at the angle of total internal reflection. This ray 935 exits the prism 900 through the first surface 910 approximately horizontally. At the same time a vertical ray (not illustrated, the vertical ray would travel along the vertical axis of symmetry 950) from the virtual camera exits vertically. Accordingly, if a camera has full FOV 90-α degrees, where a is the angle of total internal reflection, then it will cover full 90° field outside the glass. In addition, two or more such cameras would cover a FOV of 180°. Four such cameras would cover a FOV of 180° with a wider orthogonal coverage than two such cameras.

As illustrated, in order to reduce parallax artifacts between an image captured by camera C and a camera corresponding to an additional prism (for example, another prism arranged together with prism 900 in assembly 980), a plane formed by the second surface 920 bisects angle 1 formed between the virtual optical axis 950 and the camera optical axis 945, and angle 1 has an angular value of twice the angular value of angle 2. Angle 3, formed between the first surface 910 and the third surface 930 has an angular value (2α) of twice the angular value of angle 1. Each prism in the assembly and its corresponding camera can be shaped and/or arranged according to these parallax reducing design principles. Although illustrated as a point source for purposes of simplicity in FIGS. 5A-7C, it will be appreciated that camera C can include a variety of components, for example one or more of an image sensor, a mirror or refractive element to provide secondary redirection to light exiting the third surface of the prism before it is incident on the sensor, and a lens assembly positioned between the image sensor and mirror or refractive element.

The above-described embodiments of the prism array camera can be constructed in some examples based on parallax-free design principles locating the lower interior surface of the prism at the midpoint of, and orthogonal to, a line formed between the corresponding camera center of projection and the virtual center of projection of the virtual camera such that a plane formed by the lower interior surface bisects an angle formed between the virtual optical axis and a camera optical axis. In such examples the array camera may or may not be free of tilt artifacts. In other examples, the above-described embodiments of the prism array camera can be based on the parallax and tilt free design principle of FIGS. 3A through 4. This design is more restrictive than that of FIGS. 5A through 7C, but it eliminates both tilt and parallax.

V. Overview of Example Image Capture Process

Figure 8:
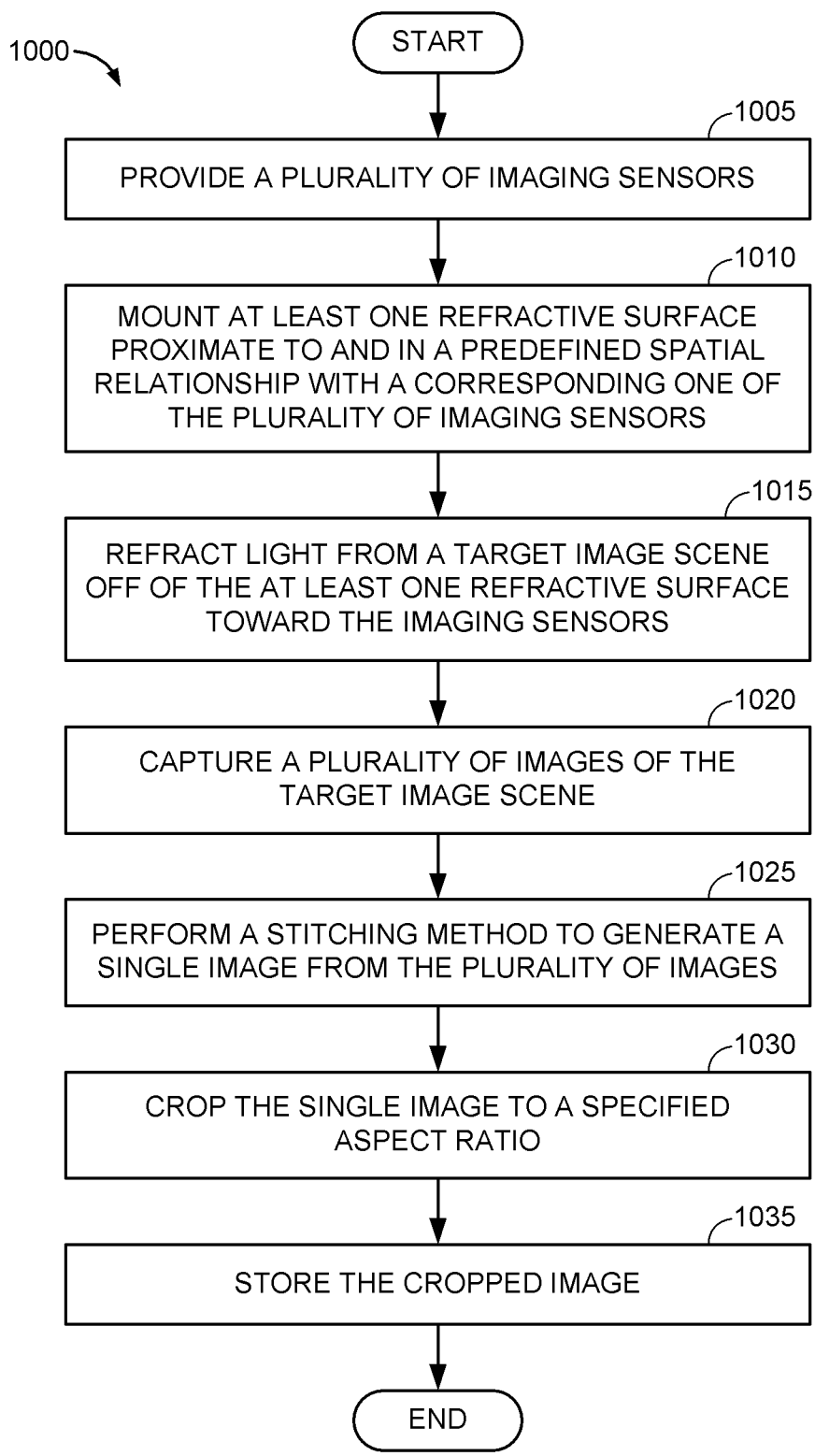
FIG. 8 illustrates an embodiment of a folded optic image capture process.

FIG. 8 illustrates an embodiment of a folded optic image capture process 1000. The process 1000 begins at block 1005, in which a plurality of imaging sensor assemblies are provided. This step includes any of the sensor array configurations discussed above with respect to the previous figures. The sensor assemblies may include, as discussed above with respect to FIGS. 1A and 1B, a sensor, lens system, and a reflective surface positioned to redirect light from the lens system onto the sensor. The sensor assemblies can alternatively include a sensor, lens system, and any of the refractive prism examples as discussed above. The process 1000 then moves to block 1010, in which at least one refractive surface is mounted proximate to the plurality of image sensors. For example, this step could comprise mounting a central prism assembly in the center of a sensor array, wherein the central prism assembly comprises at least one surface associated with each sensor in the array. Secondary mirrors or prisms can be provided in some embodiments, for example one secondary mirror or prism positioned between each sensor and the associated lens assembly to reduce an overall height of the array.

The process 1000 then transitions to block 1015, in which light comprising an image of a target scene is refracted through the at least one refractive surface toward the imaging sensors. For example, a portion of the light may be refracted through each of a plurality of prisms in the prism assembly toward a corresponding one of each of the plurality of sensors. This step may further comprise passing the light through a lens assembly associated with each sensor, and may also include reflecting the light off of a second surface onto a sensor, where the lens assembly is positioned between the refractive surface and the reflective surface. Block 1015 may further comprise focusing the light using the lens assembly and/or through movement of any of the reflective or refractive surfaces.

The process 1000 may then move to block 1020, in which the sensors capture a plurality of images of the target image scene. For example, each sensor may capture an image of a portion of the scene corresponding to that sensor's field of view. Together, the fields of view of the plurality of sensors cover at least the target image in the object space. Due to the properties of the refractive prisms used to redirect the light from the image scene toward the sensors, the total field of view can be increased relative to systems not implementing such refractive prisms while maintaining a low profile.

The process 1000 then may transition to block 1025 in which an image stitching method is performed to generate a single image from the plurality of images. In some embodiments, the image stitching module 240 of FIG. 2 may perform this step. This may include known image stitching techniques. Further, any areas of overlap in the fields of view may generate overlap in the plurality of images, which may be used in aligning the images in the stitching process. For example, block 1025 may further include identifying common features in the overlapping area of adjacent images and using the common features to align the images. In some embodiments, due to the geometric relationship between the surfaces of the refractive prisms, there may be no or substantially no parallax or tilt artifacts between the various partial images prior to stitching.

Next, the process 1000 transitions to block 1030 in which the stitched image is cropped to a specified aspect ratio, for example 4:3 or 1:1. Finally, the process ends after storing the cropped image at block 1035. For example, the image may be stored in storage 210 of FIG. 2, or may be stored in working memory 205 of FIG. 2 for display as a preview image of the target scene.

VI. Implementing Systems and Terminology

Implementations disclosed herein provide systems, methods and apparatus for multiple sensor array cameras free from parallax and tilt artifacts. One skilled in the art will recognize that these embodiments may be implemented in hardware, software, firmware, or any combination thereof.

In some embodiments, the circuits, processes, and systems discussed above may be utilized in a wireless communication device. The wireless communication device may be a kind of electronic device used to wirelessly communicate with other electronic devices. Examples of wireless communication devices include cellular telephones, smart phones, Personal Digital Assistants (PDAs), e-readers, gaming systems, music players, netbooks, wireless modems, laptop computers, tablet devices, etc.

The wireless communication device may include one or more image sensors, two or more image signal processors, a memory including instructions or modules for carrying out the processes discussed above. The device may also have data, a processor loading instructions and/or data from memory, one or more communication interfaces, one or more input devices, one or more output devices such as a display device and a power source/interface. The wireless communication device may additionally include a transmitter and a receiver. The transmitter and receiver may be jointly referred to as a transceiver. The transceiver may be coupled to one or more antennas for transmitting and/or receiving wireless signals.

The wireless communication device may wirelessly connect to another electronic device (e.g., base station). A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards such as the 3rd Generation Partnership Project (3GPP). Thus, the general term "wireless communication device" may include wireless communication devices described with varying nomenclatures according to industry standards (e.g., access terminal, user equipment (UE), remote terminal, etc.).

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A method of using a prism array camera for capturing an image of a target scene, the prism array camera including a plurality of cameras positioned around a vertical axis of symmetry of the prism array camera, each camera of the plurality of cameras comprising an image sensor and an optical axis positioned at a first angle relative to the vertical axis of symmetry, the prism array camera further including a plurality of prisms with each prism corresponding to one of the plurality of cameras, each prism having a first, second and third surface and configured to direct light received from the target scene toward a corresponding camera, the method comprising:
   receiving light from the target scene on the first surfaces of each one of the plurality of prisms, each of the plurality of prisms configured such that the received light propagates into the prism through the first surface; and
   in each prism,
      reflecting light propagating in said each prism off of the second surface, the second surface positioned such that a plane formed by the second surface bisects the first angle between the optical axis of the corresponding camera and the vertical axis of symmetry, and
      propagating the reflected light through the third surface of said each prism, the third surface positioned such that light from the target scene exits said each prism and propagates toward the corresponding camera corresponding to said each prism.

2. The method of claim 1, further comprising, for each camera, receiving the light propagated through the third surface of the corresponding prism at the image sensor of the camera.

3. The method of claim 1, wherein the first surfaces of each of the plurality of prisms are positioned orthogonally to the vertical axis of symmetry of the prism array camera.

4. The method of claim 2, further comprising providing a processor in electronic communication with the plurality of cameras.

5. The method of claim 4, further comprising receiving, by the processor from each of the plurality of cameras, an image generated from the portion of light received by the sensor.

6. The method of claim 5, further comprising combining the image from each of the plurality of cameras into a final image of the target scene.

7. The method of claim 1, wherein each of the plurality of prisms further comprises an apex at a point of intersection between the first surface and the second surface, and wherein the plurality of cameras are configured such that the optical axis of the each camera of the plurality of cameras and the vertical axis of symmetry of the prism array camera system pass through the apex.

8. The method of claim 1, wherein the third surfaces of each of the plurality of prisms are arranged at a second angle relative to the first surface, the second angle having a same angular value as the first angle.

9. The method of claim 1, wherein the third surfaces of each of the plurality of prisms each comprise a negative lens formed in or affixed to the third surface.

10. The method of claim 9, wherein propagating light through the third surface comprises refracting the reflected light through the negative lens.

11. The method of claim 9, further comprising increasing a field of view the corresponding camera by refracting the reflected light through the negative lens.

12. The method of claim 1, further comprising, for each camera of the plurality of cameras, reflecting the light propagated through the third surface of the corresponding prism off of an additional light folding surface positioned between the corresponding prism and an image sensor of the camera.

13. The method of claim 12, further comprising, for each camera of the plurality of cameras, refracting the light propagated through the third surface of the corresponding prism through a lens assembly positioned between the third surface and the additional light folding surface.

14. A method of capturing an image of a target scene with a prism array camera having a plurality of cameras, each camera positioned around a vertical axis of symmetry of the prism array camera and each camera having an optical axis positioned at a first angle relative to the vertical axis of symmetry, the method comprising:
   directing light representing the target scene through a plurality of prisms toward the plurality of cameras, each prism of the plurality of prisms corresponding to one of the plurality of cameras and each prism configured to direct a portion of light representing the target scene toward the corresponding camera at least partially by refraction, wherein directing the light comprises, for each prism:
      receiving the portion of light through a first surface positioned such that the portion of light representing the target scene enters the prism through the first surface, reflecting the portion of light from a second surface positioned such that a plane formed by the second surface bisects the first angle between the optical axis of the corresponding camera and the vertical axis of symmetry, and propagating the reflected light through a third surface positioned such that the light propagating through the third surface exits the prism and travels toward the corresponding camera.

15. The method of claim 14, further comprising, for each camera, receiving the light propagated through the third surface of the corresponding prism at an image sensor of the camera.

16. The method of claim 15, further comprising, via a processor in electronic communication with the plurality of cameras, receiving, from each of the plurality of cameras, an image generated from the light received by the sensor.

17. The method of claim 16, further comprising, via the processor, combining the image from each of the plurality of cameras into a final image of the target scene.

18. The method of claim 14, further comprising, for each camera of the plurality of cameras, reflecting the light propagated through the third surface of the corresponding prism off of an additional light folding surface positioned between the corresponding prism and an image sensor of the camera.

19. The method of claim 18, further comprising, for each camera of the plurality of cameras, refracting the light propagated through the third surface of the corresponding prism through a lens assembly positioned between the third surface and the additional light folding surface.

20. The method of claim 14, wherein in each prism the third surface comprises a negative lens, and wherein propagating the reflected light through a third surface comprises propagating the reflected light through the negative lens.

* * * * *